(12) United States Patent
Iwasaki

(10) Patent No.: US 12,387,618 B2
(45) Date of Patent: Aug. 12, 2025

(54) INFORMATION PROCESSING APPARATUS, STORAGE MEDIUM AND INFORMATION PROCESSING METHOD

(71) Applicant: CASIO COMPUTER CO., LTD., Tokyo (JP)

(72) Inventor: Shoichi Iwasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 47 days.

(21) Appl. No.: 17/748,447

(22) Filed: May 19, 2022

(65) Prior Publication Data

US 2022/0375360 A1    Nov. 24, 2022

(30) Foreign Application Priority Data

May 21, 2021 (JP) ................................. 2021-086126

(51) Int. Cl.
*G09B 7/02* (2006.01)
*G06T 11/20* (2006.01)

(52) U.S. Cl.
CPC .............. *G09B 7/02* (2013.01); *G06T 11/203* (2013.01); *G06T 11/206* (2013.01)

(58) Field of Classification Search
CPC ... G09B 5/00; G09B 5/08; G09B 7/00; G09B 7/02

See application file for complete search history.

(56) References Cited

U.S. PATENT DOCUMENTS

| 6,233,351 B1 | 5/2001 | Feeney et al. |
| 2015/0278213 A1 | 10/2015 | Anand et al. |
| 2018/0144654 A1* | 5/2018 | Olsen, Jr. ............. G06V 10/763 |

(Continued)

FOREIGN PATENT DOCUMENTS

| JP | 2002140058 A | 5/2002 |
| JP | 2003233294 A | 8/2003 |
| JP | 2006220686 A | 8/2006 |

(Continued)

OTHER PUBLICATIONS

Martelly, Daniel A, "A system for automatically grading graphs in an educational setting", Jun. 2016, Massachusetts Institute of Technology, Retrieved from Internet on Sep. 28, 2023, URL: <https://dspace.mit.edu/handle/1721.1/105975> (Year: 2016).*

(Continued)

*Primary Examiner* — Kang Hu
*Assistant Examiner* — Correll T French
(74) *Attorney, Agent, or Firm* — SCULLY SCOTT MURPHY & PRESSER, PC

(57) ABSTRACT

An information processing apparatus includes a processor that executes a program stored in a storage and generates scoring criterion information. The scoring criterion information is referenced in a scoring process of an answer figure to a problem that requires drawing of a figure in a Cartesian coordinate system. The Cartesian coordinate system is a coordinate plane or a coordinate space. In response to a reference figure being drawn in the Cartesian coordinate system based on a user operation, the scoring criterion information including information on a scoring criterion determined based on the reference figure is generated. The Cartesian coordinate system is displayed on a display.

16 Claims, 16 Drawing Sheets

(56) References Cited

U.S. PATENT DOCUMENTS

2019/0385479 A1* 12/2019 Carney ................ G06F 3/0488

FOREIGN PATENT DOCUMENTS

| JP | 2006251203 A | | 9/2006 | |
|---|---|---|---|---|
| JP | 2016103147 | * | 6/2016 | ............... G06K 9/00 |
| JP | 2016103147 A | | 6/2016 | |
| JP | 2020095208 A | | 6/2020 | |
| JP | 2022178964 A | | 12/2022 | |

OTHER PUBLICATIONS

Extended European Search Report dated Oct. 18, 2022 received in European Patent Application No. EP 22174418.8.
Decision of Rejection dated Jan. 21, 2025 received in Japanese Patent Application No. JP 2022-169596.
Communication pursuant to Article 94(3) EPC dated Apr. 7, 2025 issued in EP Application No. 22174418.8.

* cited by examiner

```
"answerType": "multiPart",
"name": "",
"parts": [{
        "name": "PartA",                                              } SUBSIDIARY QUESTION ID
        "answerType": "graph",
        "criteria": [{
                "name": "correct",
                "function": "equalsAll()"                             } SCORING LOGIC
        }
        ],
        "referenceAnswer": [{
                "objectType": "line",
                "points": [{
                        "objectType": "point",
                        "name": "$P0",
                        "x": 5,
                        "y": 10,
                        "label": ""
                }, {
                        "objectType": "point",                        } CORRECT ANSWER
                        "name": "$P1",
                        "x": -5,
                        "y": -10,
                        "label": ""
                }
                ],
        }
        ],
        "referenceGeometry": [{
        "studentAnswer": [{
                "objectType": "line",
                "points": [{
                        "objectType": "point",
                        "name": "$P2",
                        "x": 4.436666666666666,
                        "y": 10.01,
                        "label": ""
                }, {
                        "objectType": "point",                        } ANSWERER'S ANSWER
                        "name": "$P3",
                        "x": -4.510000000000002,
                        "y": -10.083333333333334,
                        "label": ""
                }
                ],
        }
        ],
        "scoreFunction": "score = correct",                           } SCORING LOGIC
        "bindBy": 0,
        "viewState": {
}
],
"studentID": "",                                                     } ANSWERER UNIQUE ID
"uniqueID": "",
"scoreFunction": "\r"
```

Reference Answers
Bind by [Index ▼]
[L0] line
Bind by [Index ▼]
Point 0
 x: [5]  y: [10]
Point 1
 x: [-5]  y: [-10]

Student Answers
[L0] line
Point 0
 x: [4.436666666667]  y: [10.01]
Point 1
 x: [-4.51]  y: [-10.08333333333]

Reference Geometry
[graphBounds] rectangle(-10, -10)-20x20
[R0] rectangle(4, 9)-2x2
[R1] rectangle(-6, -11)-2x2

Scoring Variables
| in1 | = | ☐ Not | inBox ▼ | L0.points[0] | R0 | true |
| in2 | = | ☐ Not | inBox ▼ | L0.points[1] | R1 | true |
| correct | = | | in1 | AND ▼ | in2 | true |

Scoring Logic
```
1 score = correct
2
3
4
```

45  44

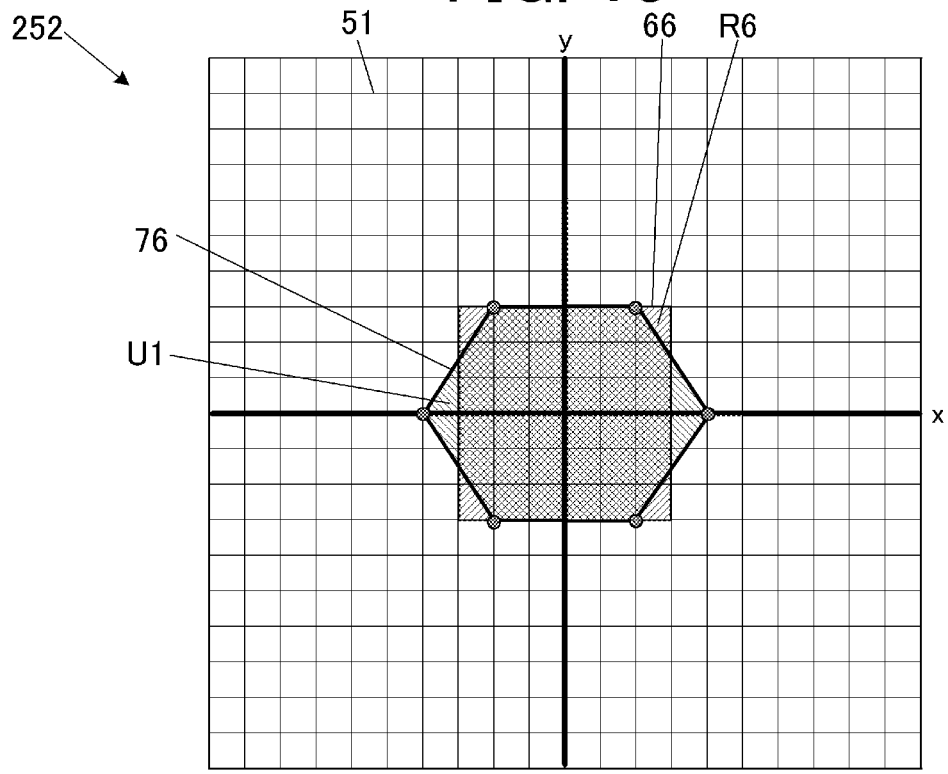

INFORMATION PROCESSING APPARATUS, STORAGE MEDIUM AND INFORMATION PROCESSING METHOD

CROSS-REFERENCE TO RELATED APPLICATIONS

This application is based upon and claims the benefit of priority from Japanese Patent Application No. 2021-086126 filed May 21, 2021, the entire content of which is incorporated herein by reference.

BACKGROUND

Technical Field

The present disclosure relates to an information processing apparatus, a storage medium and an information processing method.

Description of Related Art

As disclosed in JP 2006-251203 A, in recent years, use of CBT (Computer Based Testing), in which questions (problems) are answered on computers, has been increasing for tests at school, various qualifying examinations and so forth. In CBT, answers are obtained in the form of electronic data. Hence, use of an automatic scoring technique with computers can improve scoring precision and reduce burdens of scorers (markers).

Regarding problems that require drawing of figures, such as graphs, on coordinate planes, a restriction has been imposed on the degree of freedom of drawing in answering, thereby realizing automatic scoring with simple scoring criteria. For example, in an answering method of selecting two points on a coordinate plane, thereby automatically drawing a straight line that connects the two points, a snap technique that limits selectable points to integer coordinates is used. This enables automatic scoring with a simple scoring criterion according to which an answer is connect if coordinates of the answer and coordinates of a correct answer (model answer) exactly match.

However, the imposition of the restriction on the degree of freedom in answering cannot always measure examinees' understandings of problems effectively.

Meanwhile, in order to increase the degree of freedom in answering, a scoring criterion(s) representing a correct answer range, in which answers are determined to be correct, needs to be set in advance so that answer figures approximate to a model answer are determined to be correct. If, in setting such a scoring criterion(s), a conventional method of specifying a range on a coordinate plane by a user specifying numerical values is used, an error is likely to occur, and also it is troublesome.

SUMMARY

According to an aspect of the present disclosure, there is provided an information processing apparatus including:
a processor that executes a program stored in a storage, and generates scoring criterion information that is referenced in a scoring process of an answer figure to a problem that requires drawing of a figure in a Cartesian coordinate system that is a coordinate plane or a coordinate space,
wherein in response to a reference figure being drawn in the Cartesian coordinate system based on a user operation, the Cartesian coordinate system being displayed on a display, the scoring criterion information including information on a scoring criterion determined based on the reference figure is generated.

According to another aspect of the present disclosure, there is provided a non-transitory computer-readable storage medium storing a program that causes a processor of an information processing apparatus to generate scoring criterion information that is referenced in a scoring process of an answer figure to a problem that requires drawing of a figure in a Cartesian coordinate system that is a coordinate plane or a coordinate space,
wherein in response to a reference figure being drawn in the Cartesian coordinate system based on a user operation, the Cartesian coordinate system being displayed on a display, the scoring criterion information including information on a scoring criterion determined based on the reference figure is generated.

According to another aspect of the present disclosure, there is provided an information processing method that is performed by a computer, including:
generating scoring criterion information that is referenced in a scoring process of an answer figure to a problem that requires drawing of a figure in a Cartesian coordinate system that is a coordinate plane or a coordinate space,
wherein in response to a reference figure being drawn in the Cartesian coordinate system based on a user operation, the Cartesian coordinate system being displayed on a display, the scoring criterion information including information on a scoring criterion determined based on the reference figure is generated.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein:

FIG. 7 shows examples of contents of scoring criterion data;

FIG. 11 shows another example of the scoring criterion setting screen reflecting the contents of the reference figure setting screen shown in FIG. 9;

FIG. 18 shows the reference figure setting screen according to a fourth example;

FIG. 19 shows an example of the scoring criterion setting screen reflecting the contents of the reference figure setting screen shown in FIG. 18;

DETAILED DESCRIPTION

Hereinafter, one or more embodiments of the present disclosure will be described with reference to the drawings.
<Configuration of Scoring System>

Figure 1:
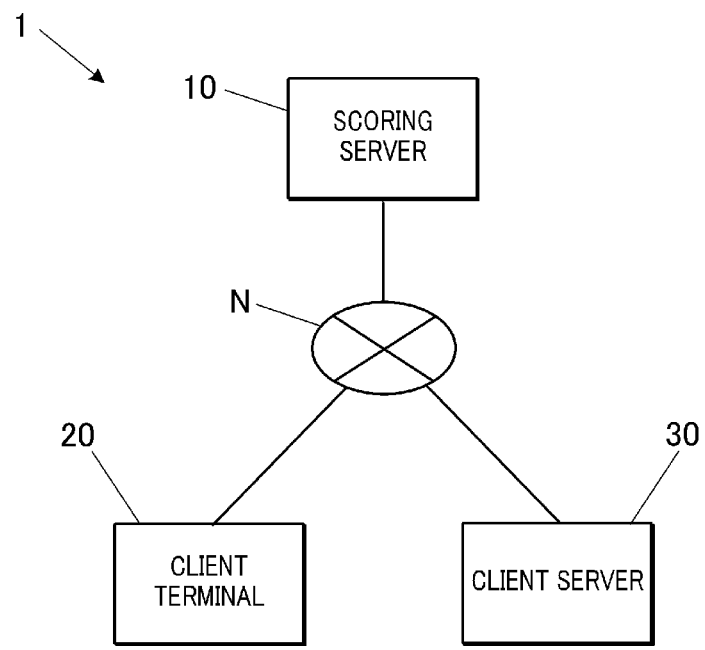
FIG. 1 shows a schematic configuration diagram of a scoring system.

FIG. 1 is a schematic configuration diagram of a scoring system 1 according to an embodiment(s).

The scoring system 1 includes a scoring server 10 (information processing apparatus), a client terminal 20 and a client server 30. The scoring server 10, the client terminal 20 and the client server 30 are connected to one another via a communication network N to perform information communications. The communication network N is, for example, the Internet, but not limited thereto and may be another network, such as a LAN (Local Area Network).

The scoring system 1 is a computer system that provides automatic scoring services in CBT. The scoring system 1 of this embodiment can perform automatic scoring of answers to problems (questions) that each require drawing of a figure(s) in a Cartesian coordinate system that is a coordinate plane. The scoring system 1 may also be able to perform automatic scoring of answers to problems in other formats (e.g., problem that requires selection of a correct answer from multiple choices, problem that requires input of a numerical value as an answer, etc.). In response to a request from the client terminal 20, the scoring server 10 of the scoring system generates scoring criterion data 332 (scoring criterion information) (shown in FIG. 4) including information on a scoring criterion(s) for a problem and sends it to the client server 30 (scoring criterion generation process). Further, in response to a call for an automatic scoring API from the client server 30, the scoring server 10 determines a score of an answer figure to a problem and sends scoring result data 335 including information on a scoring result to the client server 30 (scoring process). In the scoring process, the scoring server 10 references the scoring criterion included in the scoring criterion data 332. Details of these processes will be described later.
<Configuration of Scoring Server>

Figure 2:
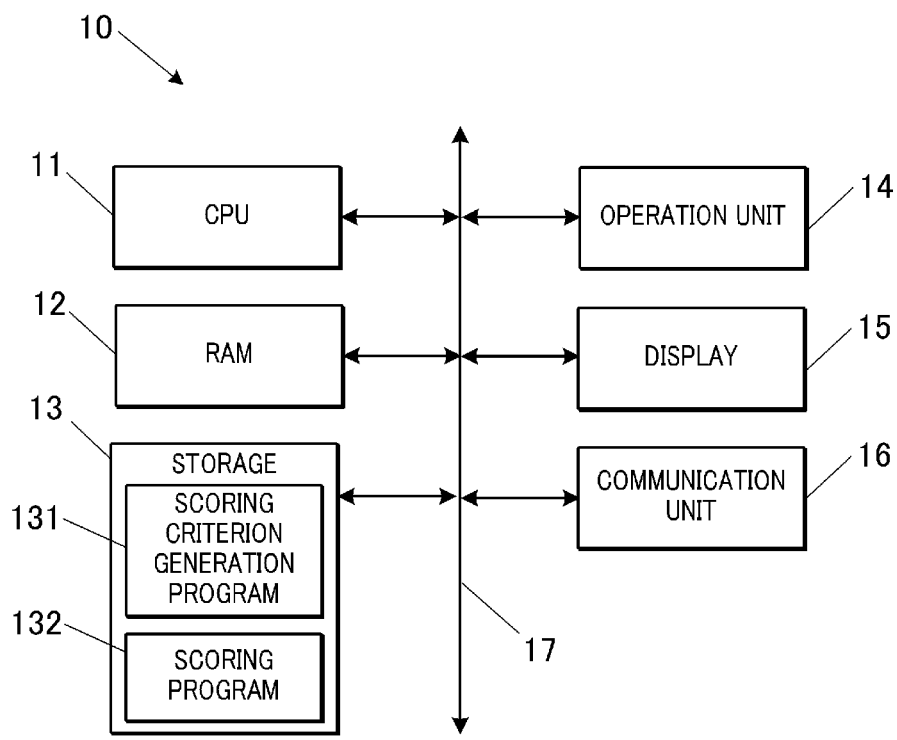
FIG. 2 is a block diagram showing a functional configuration of a scoring server.

FIG. 2 is a block diagram showing a functional configuration of the scoring server 10. The scoring server 10 includes a CPU (Central Processing Unit) 11, a RAM (Random Access Memory) 12, a storage 13, an operation unit 14, a display 15, a communication unit 16 and a bus 17. The components of the scoring server 10 are connected to one another via the bus 17.

The CPU 11 is a processor that controls operation of the components of the scoring server 10. The CPU 11 reads a scoring criterion generation program 131, a scoring program 132 or the like among various programs stored in the storage 13, loads the read program to a work area of the RAM 12, and performs a process among various processes in accordance with the loaded program. For example, the CPU 11 executes the scoring criterion generation program 131 to provide the client terminal 20 with a UI (User Interface) for generating scoring criteria, and also generate scoring criterion data 332 based on user operations at the client terminal 20 and send it to the client server 30. Further, when the automatic scoring API is called in response to a call from the client server 30, the CPU 11 executes the scoring program 132 to determine a score of an answer, generate scoring result data 335 and send it to the client server 30. The scoring server 10 may have two or more processors (e.g., two or more CPUs), and these processors may perform processes that the CPU 11 of this embodiment performs. In this case, the processors may be involved in each process, or may independently perform different processes in parallel.

The RAM 12 provides the CPU 11 with a memory space for working, and stores temporary data. The RAM 12 may include a nonvolatile memory.

The storage 13 is a non-transitory computer-readable storage medium that stores programs, data and so forth readable by the CPU 11 as a computer, and is configured by an HDD (Hard Disk Drive), an SSD (Solid State Drive) or the like. The storage 13 stores programs that are executed by the CPU 11, such as the scoring criterion generation program 131 and the scoring program 132, data that is referenced in execution of the programs, and so forth. The programs are stored in the storage 13 in the form of computer-readable program codes.

The operation unit 14 includes a pointing device, such as a mouse, and a keyboard, and receives user's point inputs, key inputs and so forth, and outputs information on these operations to the CPU 11.

The display 15 includes a display device, such as a liquid crystal display, and displays various kinds of information on the display device in accordance with display control signals from the CPU 11.

The communication unit 16 includes a router and a network card. Via the communication unit 16, the CPU 11 sends and receives data to and from the client terminal 20 and the client server 30 on the communication network N by communication connection therewith.
<Configuration of Client Terminal>

Figure 3:
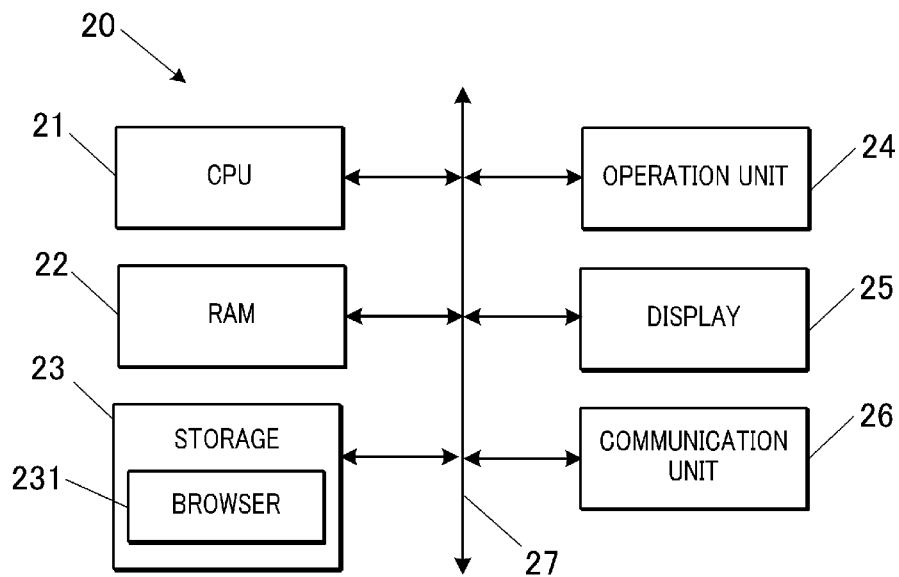
FIG. 3 is a block diagram showing a functional configuration of a client terminal.

FIG. 3 is a block diagram showing a functional configuration of the client terminal 20.

The client terminal 20 is a computer device that is used by a user who uses services of the scoring system 1 (e.g., teacher who manages student answers and scoring results thereof). The client terminal 20 is, for example, a laptop PC (Personal Computer), a desktop PC, a tablet terminal, a smartphone or the like. The client terminal 20 requests, on a browser 231, the scoring server 10 and the client server 30 to perform various processes in accordance with input operations made by the user, and displays, on a display 25, process results sent from the scoring server 10 and so forth.

The client terminal 20 includes a CPU 21, a RAM 22, a storage 23, an operation unit 24, a display 25, a communication unit 26 and a bus 27. The components of the client terminal 20 are connected to one another via the bus 27.

The CPU 21 is a processor that controls operation of the components of the client terminal 20. The CPU 21 reads a program, such as the browser 231, among various programs stored in the storage 23, loads the read program to a work area of the RAM 22, and performs a process among various processes in accordance with the loaded program.

The RAM 22 provides the CPU 21 with a memory space for working, and stores temporary data. The RAM 22 may include a nonvolatile memory.

The storage 23 is a non-transitory computer-readable storage medium that stores programs, data and so forth readable by the CPU 21 as a computer, and is configured by an HDD, an SSD or the like. The storage 23 stores programs that are executed by the CPU 21, such as the browser 231, data that is referenced in execution of the programs, and so forth. The programs are stored in the storage 23 in the form of computer-readable program codes. The browser 231 is a program to display, on the display 25, execution results of various programs sent from the scoring server 10 and the client server 30, information on web pages on the Internet, and so forth.

The operation unit 24, the display 25 and the communication unit 26 are respectively the same as the operation unit 14, the display 15 and the communication unit 16 of the scoring server 10 in configuration, and hence their descriptions will be omitted.

<Configuration of Client Server>

Figure 4:
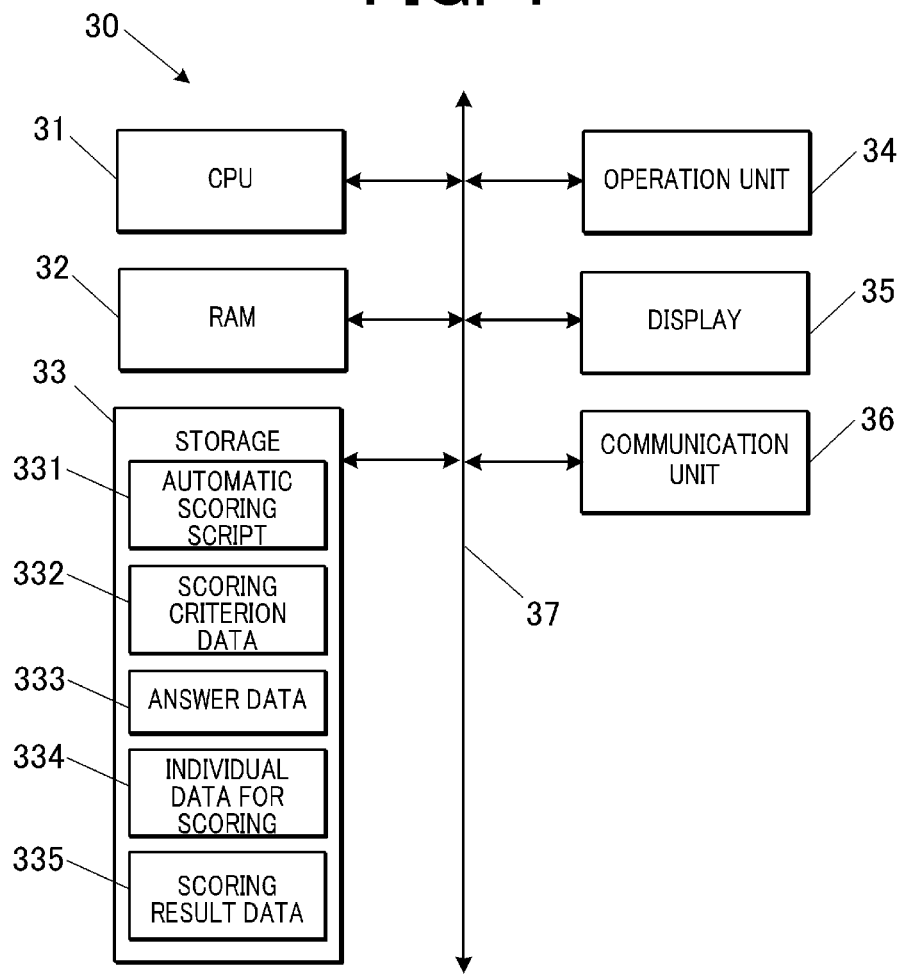
FIG. 4 is a block diagram showing a functional configuration of a client server.

FIG. 4 is a block diagram showing a functional configuration of the client server 30.

The client server 30 is a computer device that stores data (e.g., scoring criterion data for each problem, answer data, scoring result data, etc.) managed by the user who uses services of the scoring system 1, and also stores and executes an automatic scoring script(s) generated by the user.

The client server 30 includes a CPU 31, a RAM 32, a storage 33, an operation unit 34, a display 35, a communication unit 36 and a bus 37. The components of the client server 30 are connected to one another via the bus 37.

The CPU 31 is a processor that controls operation of the components of the client server 30. The CPU 31 reads a program, such as an automatic scoring script 331, among various programs stored in the storage 33, loads the read program to a work area of the RAM 32, and performs a process among various processes in accordance with the loaded program. For example, the CPU 31 executes the automatic scoring script 331 to call the automatic scoring API of the scoring server 10 with individual data for scoring 334 as arguments, thereby causing the scoring server 10 to generate scoring result data 335, and obtains the scoring result data 335. In this specification, programs include scripts that are executable without being compiled.

The RAM 32 provides the CPU 31 with a memory space for working, and stores temporary data. The RAM 32 may include a nonvolatile memory.

The storage 33 is a non-transitory computer-readable storage medium that stores programs, data and so forth readable by the CPU 31 as a computer, and is configured by an HDD, an SSD or the like. The storage 33 stores programs that are executed by the CPU 31, such as the automatic scoring script 331, data that is referenced in execution of the programs, and so forth. The programs are stored in the storage 33 in the form of computer-readable program codes. The automatic scoring script 331 is usually created by the user of the scoring system 1 for a purpose, but a pre-created one may be used.

Examples of the data stored in the storage 33 include scoring criterion data 332, answer data 333 (answer information), individual data for scoring 334 and scoring result data 335.

The scoring criterion data 332 is referenced in the scoring process of an answer figure to a problem that requires drawing of a figure in a Cartesian coordinate system that is a coordinate plane. The scoring criterion data 332 includes information on a scoring criterion(s) that is used in the scoring process. The scoring criterion data 332 is generated by the scoring server 10 in response to a request from the client terminal 20, and sent to the client server 30 and stored in the storage 33. The scoring criterion data 332 is a file in a format referenceable as arguments in execution of the automatic scoring API of the scoring server 10, a file in json format in this embodiment.

The answer data 333 is data of an answer figure generated by an answerer who tackles a problem, such as a student, with a not-shown terminal device for answering. If there are two or more answerers, the answer data 333 is generated by/for each answerer. Data items included in the answer data 333 are predetermined for each problem.

The individual data for scoring 334 is data made of the answer data 333 of an answerer (individual) inserted into the scoring criterion data 332. Hence, the individual data for scoring 334 includes the scoring criterion information and the answer information generated by one answerer. If there are two or more answerers, the individual data for scoring 334 is generated for each answerer. The individual data for scoring 334 is a file in the same format as the scoring criterion data 332, the json format in this embodiment.

The scoring result data 335 includes information on a scoring result of an answer. The scoring result data 335 is generated by the scoring server 10 with the automatic scoring API called with the individual data for scoring 334 as arguments, and sent to the client server 30.

The operation unit 34, the display 35 and the communication unit 36 are respectively the same as the operation unit 14, the display 15 and the communication unit 16 of the scoring server 10 in configuration, and hence their descriptions will be omitted.

<Operation of Scoring System>

Next, operation of the scoring system 1 will be described, focusing on operation to generate a scoring criterion(s) and operation to determine a score of an answer using the scoring criterion. Although the main agents of these operations are the CPU 11 of the scoring server 10, the CPU 21 of the client terminal 20 and the CPU 31 of the client server 30, hereinafter the scoring server 10, the client terminal 20 and the client server 30 may be referred to as the main agents for the sake of convenience.

Figure 5:
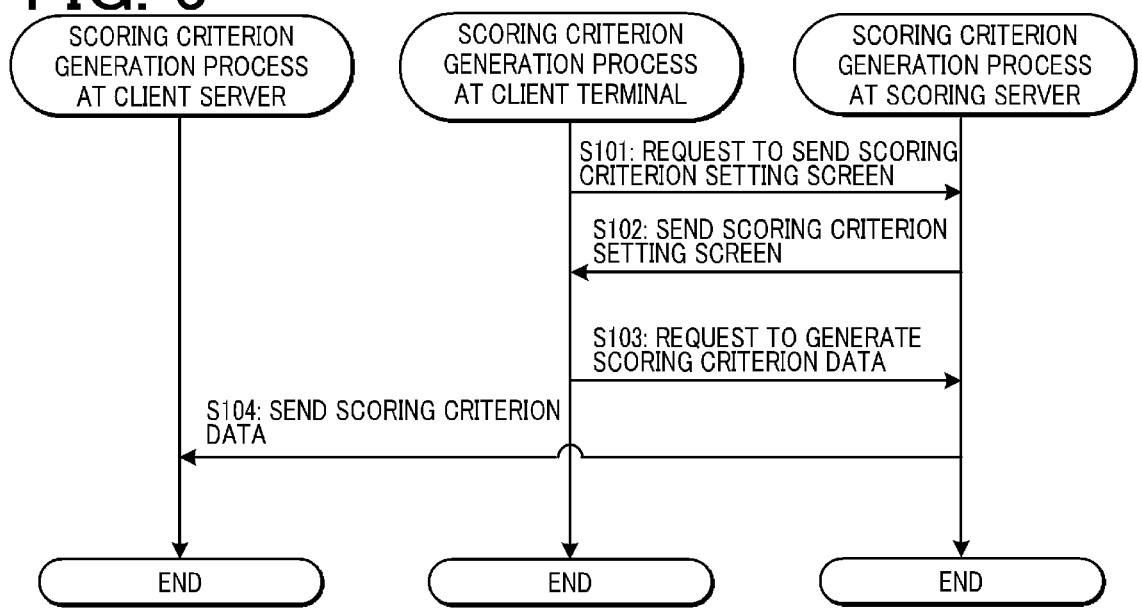
FIG. 5 is a sequence diagram to explain a scoring criterion generation process.

FIG. 5 is a sequence diagram to explain the scoring criterion generation process.

FIG. 5 shows flow of signals that are sent and received between the scoring server 10, the client terminal 20 and the client server 30 in the scoring criterion generation process.

First, a user who uses a function of automatic scoring provided by the scoring system 1 starts the browser 231 at the client terminal 20, and accesses a predetermined URL. The client terminal 20 then requests the scoring server 10 to send display data for displaying a scoring criterion setting screen 251 (Step S101). In response to the request, the scoring server 10 executes the scoring criterion generation program 131, and sends the display data for displaying the scoring criterion setting screen 251 to the client terminal 20 to cause the client terminal 20 to display the scoring criterion setting screen 251 on the display 25 (Step S102).

Figure 6:
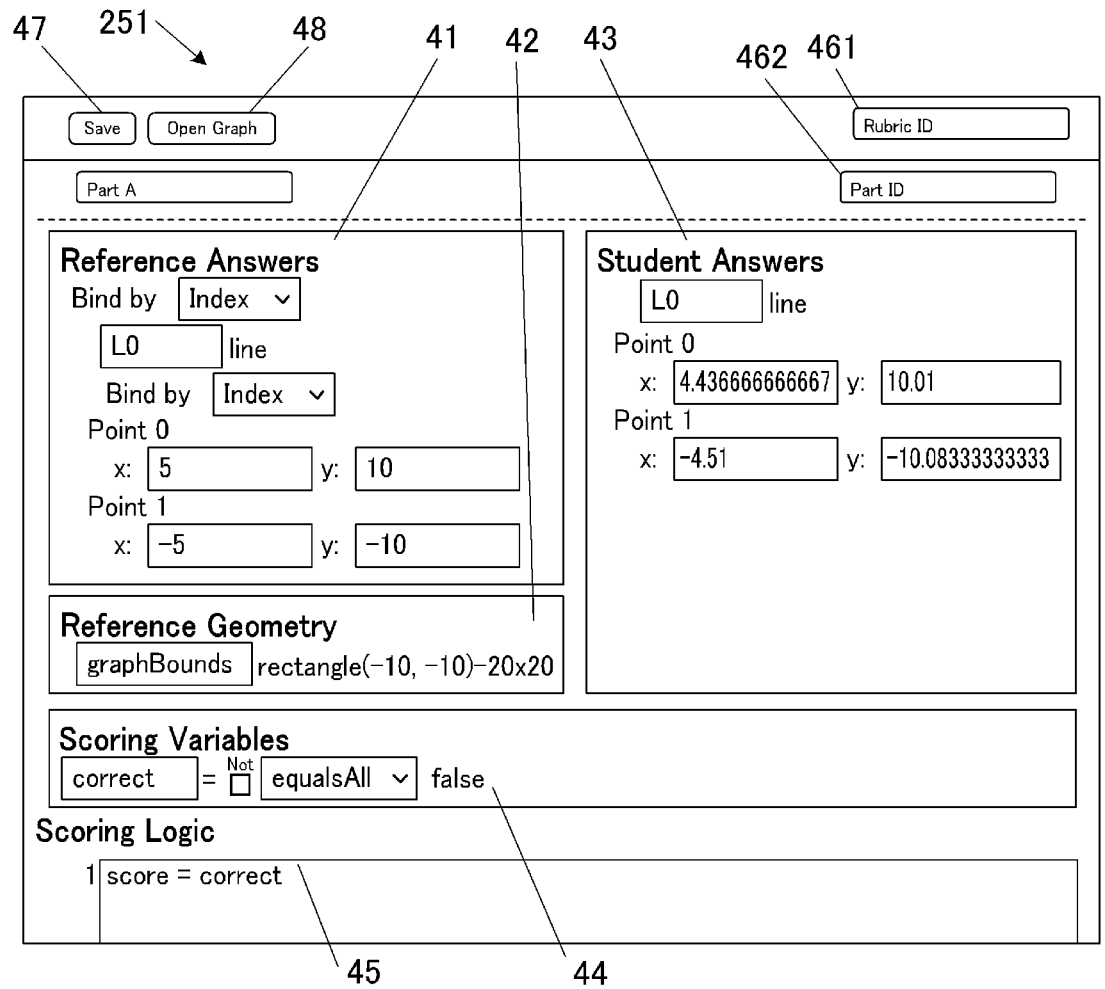
FIG. 6 shows an example of a scoring criterion setting screen.

FIG. 6 shows an example of the scoring criterion setting screen 251.

On the scoring criterion setting screen 251, reference/correct answer information 41, reference geometry information 42, answer figure information 43, scoring variable information 44, scoring logic information 45, a question ID 461, a subsidiary question ID 462, a save button 47, a reference figure drawing button 48 and so forth are displayed. Hereinafter, a point having "a" as x-coordinate and "b" as y-coordinate on an x-y coordinate plane that is used for answering a problem is referred to as a point (a, b).

The reference/correct answer information 41 is information on a correct figure set by the user as a model answer to a problem. In FIG. 6, a straight line L0 having Point 0 (5, 10) and Point 1 (−5, −10) as two endpoints is set as a correct figure. The setting "Bind by index" means that scoring is carried out by taking the answering order of multiple answer elements provided after this setting into account. In the example shown in FIG. 6, a point selected first in answering by an answerer is treated as Point 0, and a point selected second in answering by the answerer is treated as Point 1. If the part "index" in the "Bind by index" is changed from a drop-down list to be "Bind by any", scoring is carried out without taking the answering order into account. In this case, the two points selected first and second are treated as "Point 0, Point 1" and "Point 1, Point 0", and both combinations are subjected to scoring. The one having a higher score is adopted as a scoring result.

The reference geometry information 42 is information on geometries that are referenced in the scoring process. In FIG. 6, as a reference geometry, "graphBounds" representing a coordinate plane that is used for answering is set. The "graphBounds" in this embodiment is a rectangular region (square region, to be more specific) having a length in x-direction of 20 and a length in y-direction of 20 with a point (−10, −10) as the lower left end. In FIG. 6, only one reference geometry, the "graphBounds", is set, but two or more reference geometries may be set.

The answer figure information 43 is data on an answerer's answer figure. At the stage where scoring criteria are set, dummy answer figure information 43 is input for providing parts into which an answerer's answer data is to be inserted. In this embodiment, coordinate data of the two endpoints P0 (Point 0), P1 (Point 1) of the straight line L0 as an answer figure is input to correspond to the reference/correct answer information 41.

The scoring variable information 44 is information on scoring variables to construct scoring logic in the scoring logic information 45. In this embodiment, to the scoring variable "correct", a value of the automatic scoring function "equalsAll" is assigned. The automatic scoring function "equalsAll" is a function to return "true (1)" if data of the reference/correct answer information 41 (in this embodiment, coordinates of Point 0 and Point 1) and data of the answer figure information 43 (same as the above, i.e., coordinates of Point 0 and Point 1) exactly match, and returns "false (0)" if they do not exactly match. In FIG. 6, one scoring variable is used, but two or more scoring variables may be set.

The scoring logic information 45 is information on the scoring logic using the scoring variable(s) in the scoring variable information 44. In FIG. 6, the logical formula "score=correct" determines a score. In the example shown in FIG. 6, the data of the reference/correct answer information 41 and the data of the answer figure information 43 do not exactly match, so that the scoring variable "correct" is "false (0)", and the score is "0".

The question ID 461 is a unique code assigned to a question (problem). The question ID 461 can call the scoring criterion data 332 for the problem. The subsidiary question ID 462 is a unique code assigned to a subsidiary question (subsidiary problem) included in a problem. If a problem includes two or more subsidiary problems, the scoring criterion data 332 for the problem includes information on two or more sets of scoring criteria for the respective subsidiary problems. In this case, scoring can be carried out, for example, by a method of adding up scores of subsidiary problems of a problem to be the total score of the problem or a method of determining that a problem is correctly answered if all subsidiary problems of the problem are correctly answered.

The save button 47 is a button for generating scoring criterion data 332 with the contents of the scoring criterion setting screen 251 at the time.

The reference figure drawing button 48 is a button that is selected to draw, on a graph viewer, reference figures that are used for setting scoring criteria. A method for setting scoring criteria using reference figures will be described later.

When the save button 47 is selected, the client terminal 20 sends a request to the scoring server 10 to generate scoring criterion data 332 (Step S103 in FIG. 5). The scoring server 10 that has received the request performs a process in accordance with the scoring criterion generation program 131, generates scoring criterion data 332 in the json format and sends it to the client server 30 (Step S104). When the scoring criterion data 332 is stored in the storage 33 of the client server 30 in Step S104, the scoring criterion generation process ends.

FIG. 7 shows examples of contents of scoring criterion data 332.

As an example, FIG. 7 shows the scoring criterion data 332 reflecting the contents of the scoring criterion setting screen 251 shown in FIG. 6. The scoring criterion data 332 includes a subsidiary question ID, scoring logic, a correct answer (contents of the reference/correct answer information 41), an answerer's answer (contents of the answer figure information 43) and an answerer ID to identify an answerer. The scoring criterion data 332 shown in FIG. 7 is merely an example and hence is not limited to the format shown therein.

Next, the scoring process for automatically determining a score of an answer figure using generated scoring criterion data 332 will be described.

Figure 8:
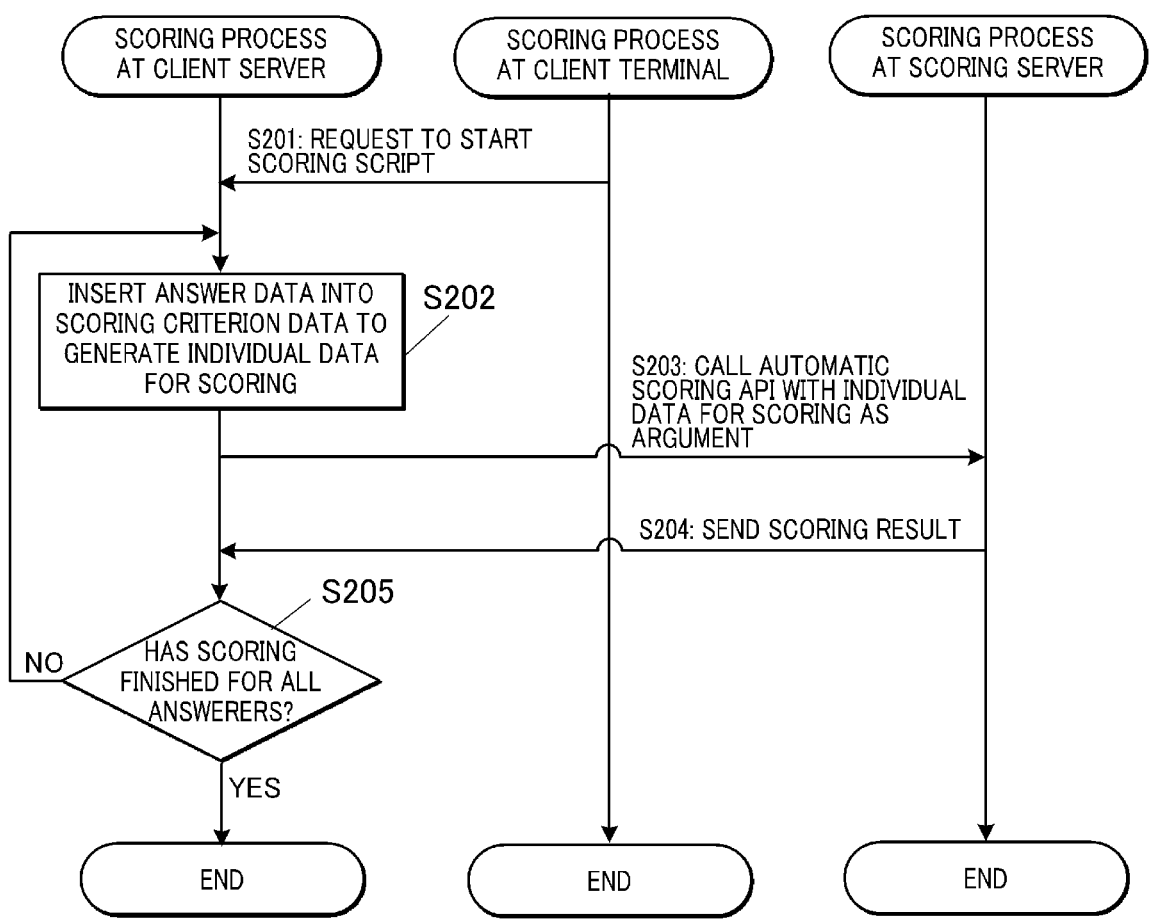
FIG. 8 is a sequence diagram to explain a scoring process.

FIG. 8 is a sequence diagram to explain the scoring process.

The scoring process is started by a predetermined user operation at the client terminal 20 in a state in which scoring criterion data 332 and answer data 333 are stored in the storage 33 of the client server 30.

When the scoring process is started, the client terminal 20 requests the client server 30 to start the automatic scoring script 331 (Step S201).

In response to the request, the client server 30 executes the automatic scoring script 331. The client server 30 first inserts one answer data 333 into the scoring criterion data 332 to generate individual data for scoring 334, and stores it in the storage 33 (Step S202). In Step S202, the client server 30 generates the individual data for scoring 334 by replacing the "Answerer's Answer" in the scoring criterion data 332 shown in FIG. 7 with the contents of the actual answer of an answerer. In this manner, the client server 30 generates the individual data for scoring 334 that includes the information on the scoring criterion included in the scoring criterion data 332 and the answer data 333 of an answerer.

Next, the client server 30 calls the automatic scoring API of the scoring server 10 with the individual data for scoring 334 generated in Step S202 as arguments (Step S203). In response to the call for the automatic scoring API, the scoring server 10 executes the scoring program 132, generates scoring result data 335 and sends it to the client server 30 (Step S204). In this embodiment, the scoring server 10 determines a score of the answer data 333 included in the received individual data for scoring 334, referencing the scoring criterion of the scoring criterion data 332 included in the individual data for scoring 334. In the case shown in FIG. 6 and FIG. 7, the scoring server 10 first compares the coordinates in the reference/correct answer information 41 with the coordinates in the answer figure information 43 corresponding to the answer data 333, and obtains a value of the scoring variable "correct". The scoring server 10 then calculates a score in accordance with the scoring logic "score=correct", and generates scoring result data 335 including information on the score.

When receiving the scoring result data 335, the client server 30 determines whether scoring has finished for all answerers (Step S205). If the client server 30 determines that there is at least one answerer for whom scoring has not finished yet (Step S205; "NO"), the client server 30 performs Step S202 again with the answer data 333 of the next answerer. If the client server 30 determines that scoring has finished for all answerers (Step S205; "YES"), the client server 30 exits the automatic scoring script 331. Thus, the scoring process ends.

<Method for Setting Scoring Criteria Using Reference Figures>

In the scoring system 1 of this embodiment, in order to set scoring criteria with the scoring criterion setting screen 251, it is possible to display (draw) reference figures on the display 25 of the client terminal 20 and reflect information on the reference figures in the scoring criteria. Hereinafter, first to fifth examples of the method for setting scoring criteria with reference figures will be described.

First Example

First, as a first example, a case will be described where determination regions are defined by reference figures, and a scoring criterion about a positional relationship between the determination regions and an answer figure is set.

Figure 9:
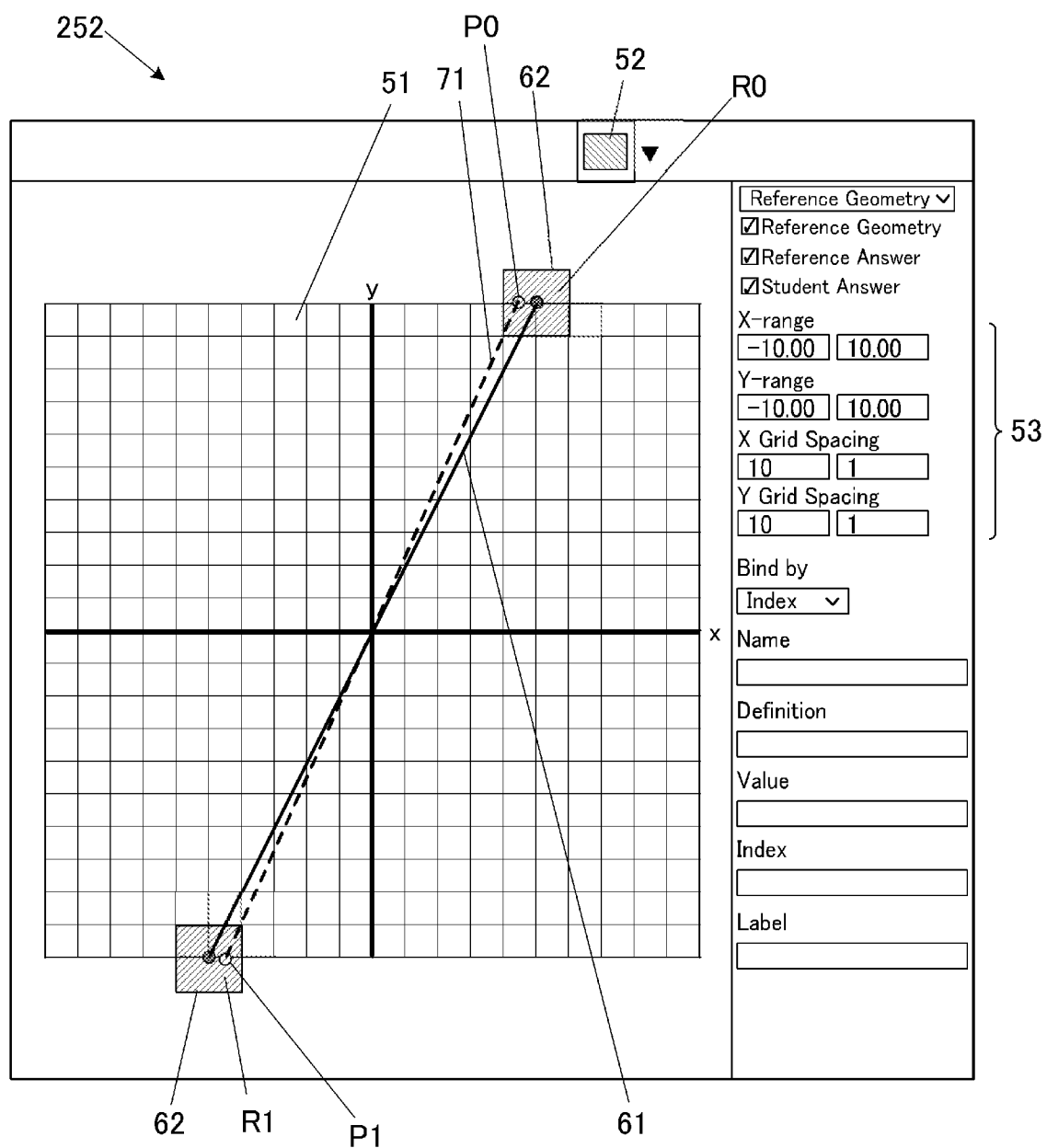
FIG. 9 shows a reference figure setting screen according to a first example.

FIG. 9 shows a reference figure setting screen 252 according to the first example.

The reference figure setting screen 252 is the graph viewer displayed on the display 25 when the reference figure drawing button 48 is selected on the scoring criterion setting screen 251. On the reference figure setting screen 252, a coordinate plane 51 (Cartesian coordinate system), a mode selection button 52, a reference line 61, reference rectangles 62, an answer FIG. 71 and so forth are displayed. Among these, the reference line 61 and the reference rectangles 62 are examples of reference figures.

The coordinate plane 51 corresponds to the "graphBounds" set in the reference geometry information 42 on the scoring criterion setting screen 251. On this coordinate plane 51, the reference line 61, the reference rectangles 62 and the answer FIG. 71 are drawn, for example. The coordinate ranges (x-range, y-range) and grid spacing(s) (x grid spacing, y grid spacing) of the coordinate plane 51 can be changed by inputting numerical values in text boxes 53 provided at the right side on the reference figure setting screen 252. This change is reflected in the contents of the "graphBounds" in the reference geometry information 42 on the scoring criterion setting screen 251. Further, reference values can be displayed on the x axis and/or the y axis of the coordinate plane 51 in accordance with to user operations. For example, "0" representing the origin can be displayed at the intersection of the x axis and the y axis.

The mode selection button 52 is a button for specifying a mode for drawing reference figures on the reference figure setting screen 252. When the mode selection button 52 is selected, a not-shown group of icons representing multiple drawing mode choices is displayed, and the current drawing mode can be changed to another by selecting an icon from the icons. The drawing modes include a line drawing mode for drawing reference lines as reference figures, a region specifying mode for specifying regions based on reference lines, and a rectangle drawing mode for drawing reference rectangles as reference figures.

In this example, the reference line 61 corresponds to the straight line L0 (correct figure set by the user as a model answer to a problem) set in the reference/correct answer information 41 on the scoring criterion setting screen 251. The reference line 61 can be generated by selecting the line drawing mode with the mode selection button 52, and making an operation(s) to specify two endpoints on the coordinate plane 51 (e.g., operations of putting a mouse cursor on desired points and clicking). For specifying the endpoints, the snap technique may be employed that limits selectable points to integer coordinates. The shape of the reference line 61 may be changed by an operation(s) to change the position(s) of the endpoint(s) of the reference line 61, and this change may be reflected in the reference/correct answer information 41 on the scoring criterion setting screen 251. On the contrary, if the coordinate data of one or both of the two endpoints (Point 0, Point 1) in the reference/correct answer information 41 is changed, this change may be reflected in the reference line 61 on the reference figure setting screen 252.

The reference rectangles 62 are rectangles having sides parallel to the coordinate axes of the coordinate plane 51. The reference rectangles 62 shown in FIG. 9 are squares having a length of each side of 2 with the two endpoints of the reference line 61 as their respective centers. The reference rectangles 62 represent boundaries respectively defining determination regions R0, R1. The positional relationship between these determination regions R0, R1 and the answer FIG. 71 can be set as a scoring criterion. For example, the scoring criterion can be set such that the answer FIG. 71 is determined to be correct if it is partly in each of the determination regions R0, R1. In this case, not only the answer FIG. 71 that exactly matches with the reference line 61 as a correct figure but also the answer FIG. 71 that is partly in each of the determination regions R0, R1 are determined to be correct. Alternatively, the scoring criterion may be set such that the answer FIG. 71 having predetermined feature points (two endpoints P0, P1) respectively located in the determination regions R0, R1 is determined to be correct.

The reference rectangles 62 are drawn on the coordinate plane in accordance with user operations in a state in which the rectangle drawing mode is selected with the mode selection button 52. The user operations are, for example, operations to specify positions of opposite vertices of the reference rectangles 62 on the coordinate plane 51. On the basis of these user operations, the CPU 11 identifies the positions of the reference rectangles 62 on the coordinate plane 51. The user operations may be drag operations. In this case, the CPU 11 identifies the start point and the end point of each drag operation as the positions of opposite vertices of each reference rectangle 62. For specifying the positions of the opposite vertices of the reference rectangles 62, the snap technique may be employed that limits selectable points to integer coordinates.

The answer FIG. 71 corresponds to the straight line L0 in the answer figure information 43 on the scoring criterion setting screen 251. At the stage where criteria are generated, the answer FIG. 71 is a dummy.

Figure 10:
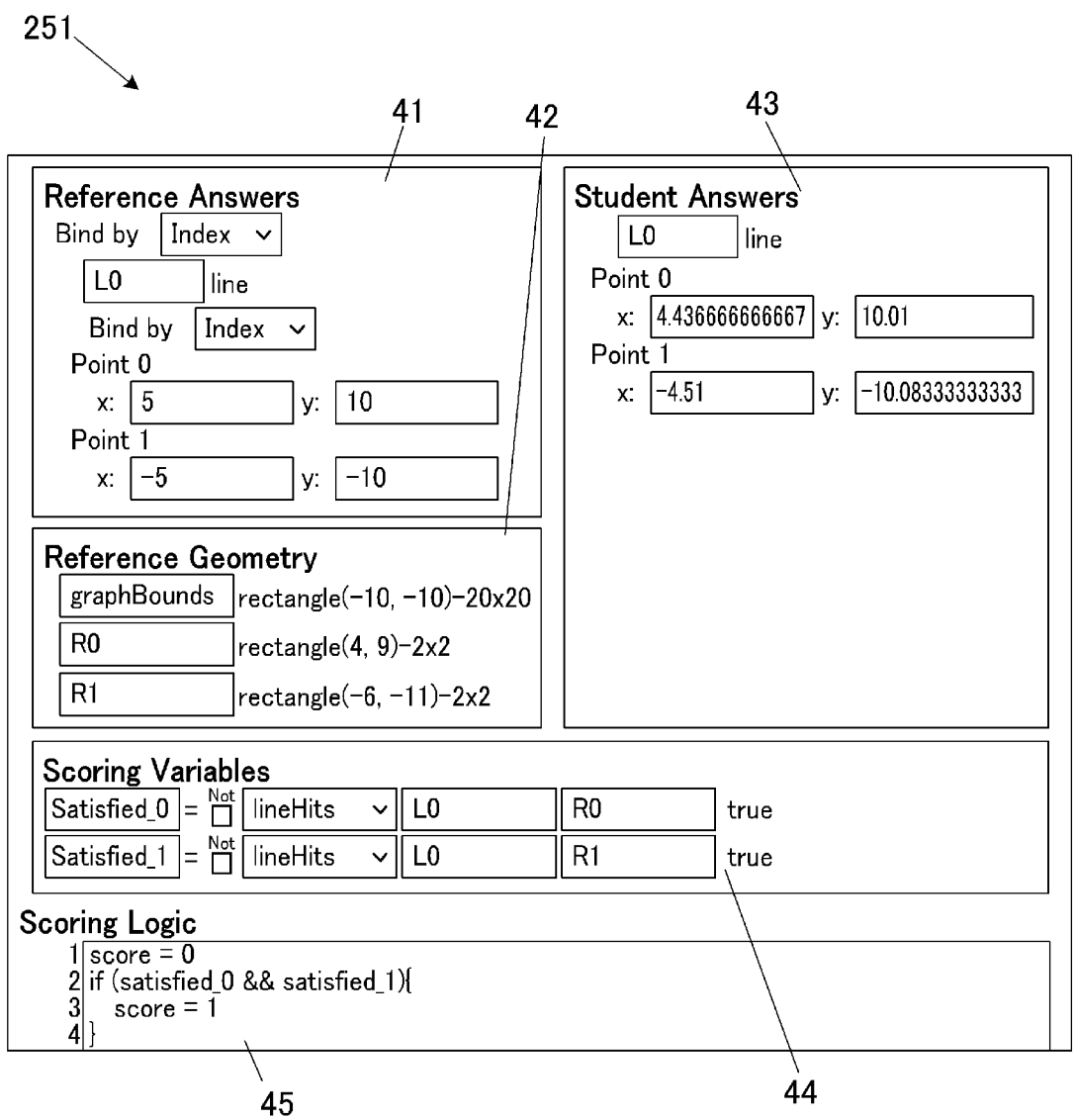
FIG. 10 shows an example of the scoring criterion setting screen reflecting the contents of the reference figure setting screen shown in FIG. 9.

FIG. 10 shows an example of the scoring criterion setting screen 251 reflecting the contents of the reference figure setting screen 252 shown in FIG. 9.

In the reference geometry information 42 on the scoring criterion setting screen 251 shown in FIG. 10, as reference geometries, the "graphBounds" representing a coordinate region for answering and the determination regions "R0", "R1" corresponding to the two reference rectangles 62 are defined and displayed. The coordinate data or the like representing the determination regions "R0", "R1" in the reference geometry information 42 is calculated by the CPU 11 from the contents of the determination regions R0, R1 on the reference figure setting screen 252 and displayed. This eliminates the need for the user to input coordinate data of the determination regions "R0", "R1" as reference geometries and accordingly saves user time and effort.

In the scoring variable information 44, the scoring variables "satisfied_0" and "satisfied_1" are defined and displayed. To the scoring variable "satisfied_0", a value of the automatic scoring function "lineHits" with the straight line "L0" in the answer figure information 43 and the determination region "R0", which is a reference geometry, as arguments is assigned. To the scoring variable "satisfied_1", a value of the automatic scoring function "lineHits" with the straight line "L0" in the answer figure information 43 and the determination region "R1", which is a reference geometry, as arguments is assigned. The automatic scoring function "lineHits" is a function to return "true" if a straight line as an argument is partly in a determination region as an argument.

In the scoring logic information 45, the scoring logic is defined to make the "score" "1" if the scoring variables "satisfied_0" and "satisfied_1" are both "true". In the case shown in FIG. 9 and FIG. 10, the straight line L0 (answer FIG. 71) in the answer figure information 43 is partly in each of the determination regions R0, R1, so that the "score" calculated is "1". Thus, the scoring criterion data 332 generated with the scoring criterion setting screen 251 shown in FIG. 10 is used in the scoring process to determine whether the answer FIG. 71 is partly in each of the determination regions R0, R1.

FIG. 11 shows another example of the scoring criterion setting screen 251 reflecting the contents of the reference figure setting screen 252 shown in FIG. 9.

In the scoring variable information 44 on the scoring criterion setting screen 251 shown in FIG. 11, the scoring variables "in1", "in2" and "correct" are defined and displayed. To the scoring variable "in1", a value of the automatic scoring function "inBox" with "L0.points[0]" representing one endpoint P0 of the straight line L0 in the answer figure information 43 and the determination region "R0" as arguments is assigned. To the scoring variable "in2", a value of the automatic scoring function "inBox" with "L0.points[1]" representing the other endpoint P1 of the straight line L0 in the answer figure information 43 and the determination region "R1" as arguments is assigned. The automatic scoring function "inBox" is a function to return "true" if a point as an argument is located in a determination region as an argument. The scoring variable "correct" is defined to be "true" if the scoring variables "in1" and "in2" are both "true".

In the scoring logic information 45, the logical formula "score=correct" determines a score. In the case shown in FIG. 9 and FIG. 11, the endpoints P0, P1 of the straight line L0 (answer FIG. 71) in the answer figure information 43 are respectively located in the determination regions R0, R1, so that the scoring variables "in1", "in2" and "correct" are all "true (1)", and the "score" calculated is "1". Thus, the scoring criterion data 332 generated with the scoring criterion setting screen 251 shown in FIG. 11 is used in the scoring process to determine whether predetermined feature points (two endpoints P0, P1 in the first example) of the answer FIG. 71 are respectively located in the determination regions R0, R1.

As shown in FIG. 10 and FIG. 11, the definitions of the scoring variables in the scoring variable information 44 and the contents of the scoring logic in the scoring logic information 45 can be freely set by the user in accordance with a desired scoring method.

Second Example

In the first example, the reference rectangles 62 as reference figures respectively define the determination regions R0, R1. Instead of this, two or more reference lines as reference figures may define a determination region (R4), serving as its boundary.

Figure 12:
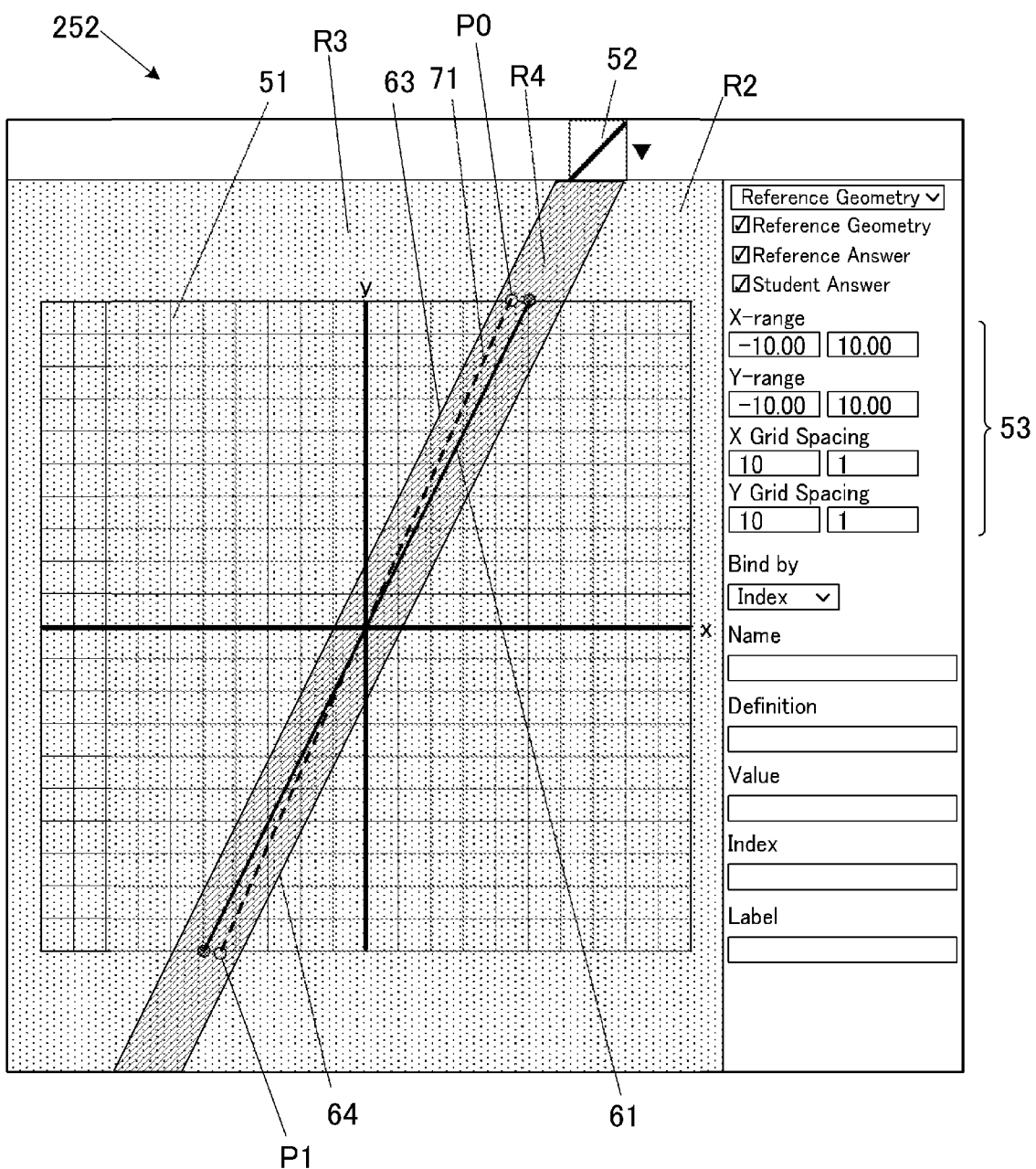
FIG. 12 shows the reference figure setting screen according to a second example.

FIG. 12 shows the reference figure setting screen 252 according to a second example.

On the reference figure setting screen 252 shown in FIG. 12, instead of the reference rectangles 62 shown in FIG. 9, reference lines 63, 64 are displayed. The reference lines 63, 64 are examples of reference figures. The reference line 63 corresponds to the graph of the function y=2x+2, and the reference line 64 corresponds to the graph of the function y=2x−2. A region with the reference line 63 as its boundary and the y-coordinate being equal to or smaller than that of the reference line 63 is a determination region R2, and a region with the reference line 64 as its boundary and the y-coordinate being equal to larger than that of the reference line 64 is a determination region R3. In other words, the determination region R2 is a region satisfying y≤2x+2, and the determination region R3 is a region satisfying y≥2x−2. Hereinafter, the overlap area of the determination regions R2, R3 is referred to as a determination region R4.

Figure 13:
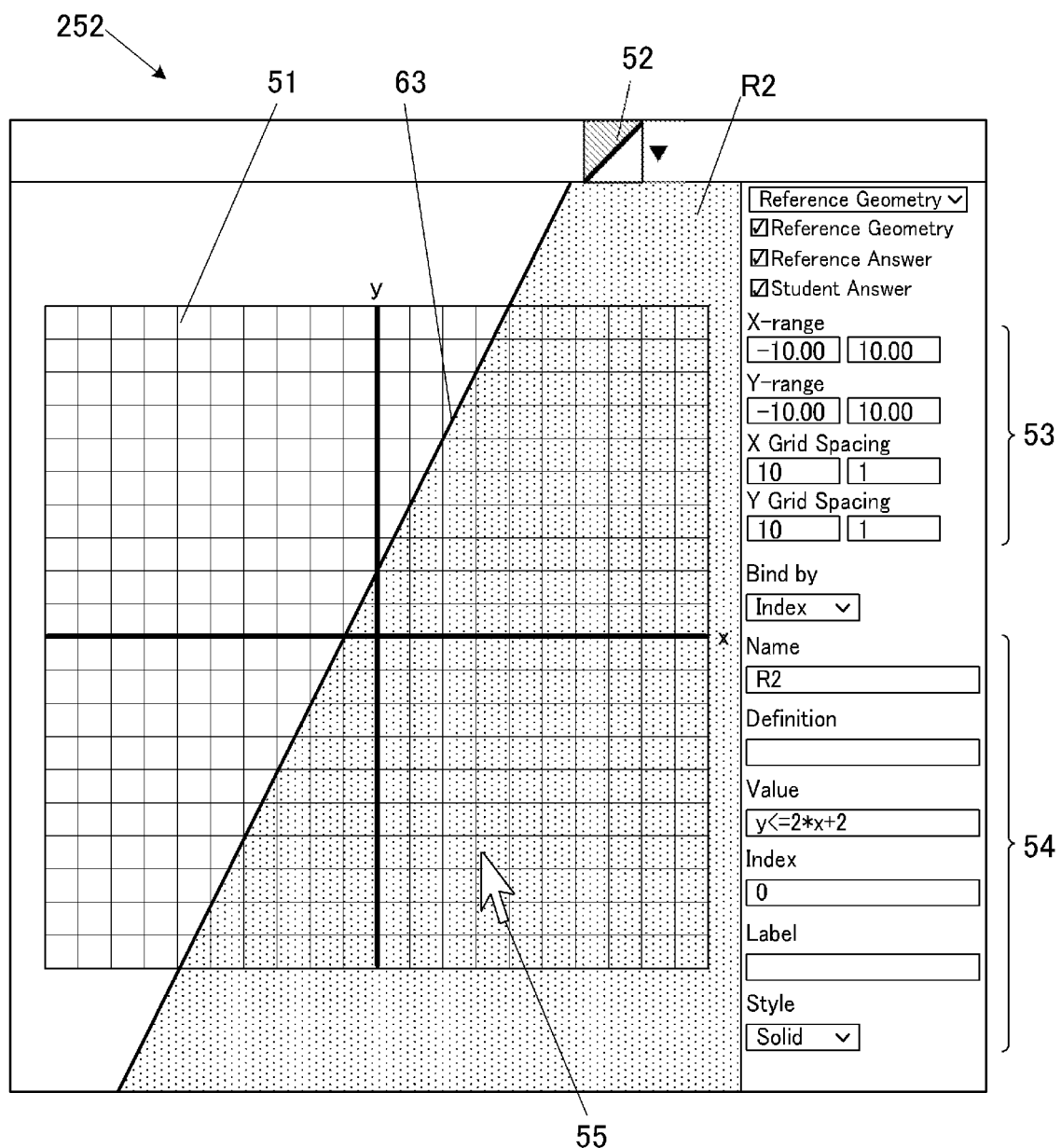
FIG. 13 is an illustration to explain a determination region setting method.

The determination regions R2, R3 shown in FIG. 12 are set by the following procedure. First, as shown in FIG. 13, the region specifying mode is selected with the mode selection button 52, and the reference line 63 is drawn. The reference line 63 can be drawn by a user operation(s) to specify two points on the coordinate plane 51. From this state, a user operation (mouse over operation) is made to put a cursor 55 on one side or the other side of the reference line 63 on the display screen (reference figure setting screen 252), so that the one side or the other side of the reference line 63 can be specified as the determination region R2. In FIG. 13, the cursor 55 is put on the side having the y-coordinate smaller (x-coordinate larger) than that of the reference line 63, so that the determination region R2 is specified. The contents of the specified determination region R2 are reflected in an information display section 54 provided at the right side on the reference figure setting screen 252. If the contents input in the text boxes of the information display section 54 are changed, this change may be reflected in the reference line 63 and the determination region R2. When a confirmation operation, such as a click operation, is made in the state shown in FIG. 13, the reference line 63 and the determination region R2 are fixed and reflected in the reference geometry information 42 on the scoring criterion setting screen 251. The user operation to specify the determination region R2 may be an operation other than the mouse over operation.

Figure 14:
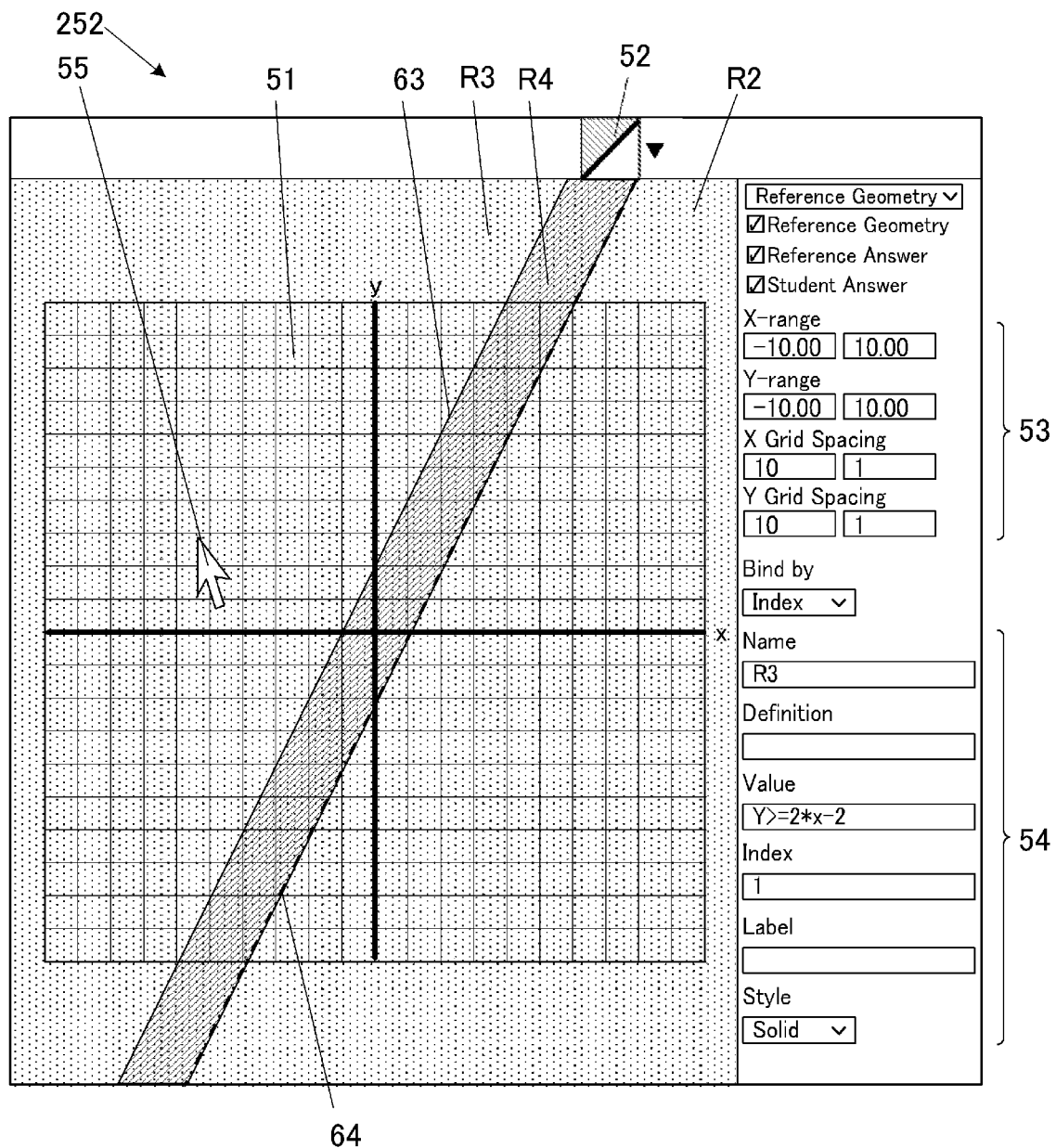
FIG. 14 is an illustration to explain the determination region setting method.

Next, as shown in FIG. 14, the reference line 64 is drawn, and the cursor 55 is put on the side having the y-coordinate larger (x-coordinate smaller) than that of the reference line 64, so that the determination region R3 is specified. When a click operation or the like is made in the state shown in FIG. 14, the reference line 64 and the determination region R3 are fixed. Also, the determination region R4, which is the overlap area of the determination regions R2, R3, is fixed.

Figure 15:
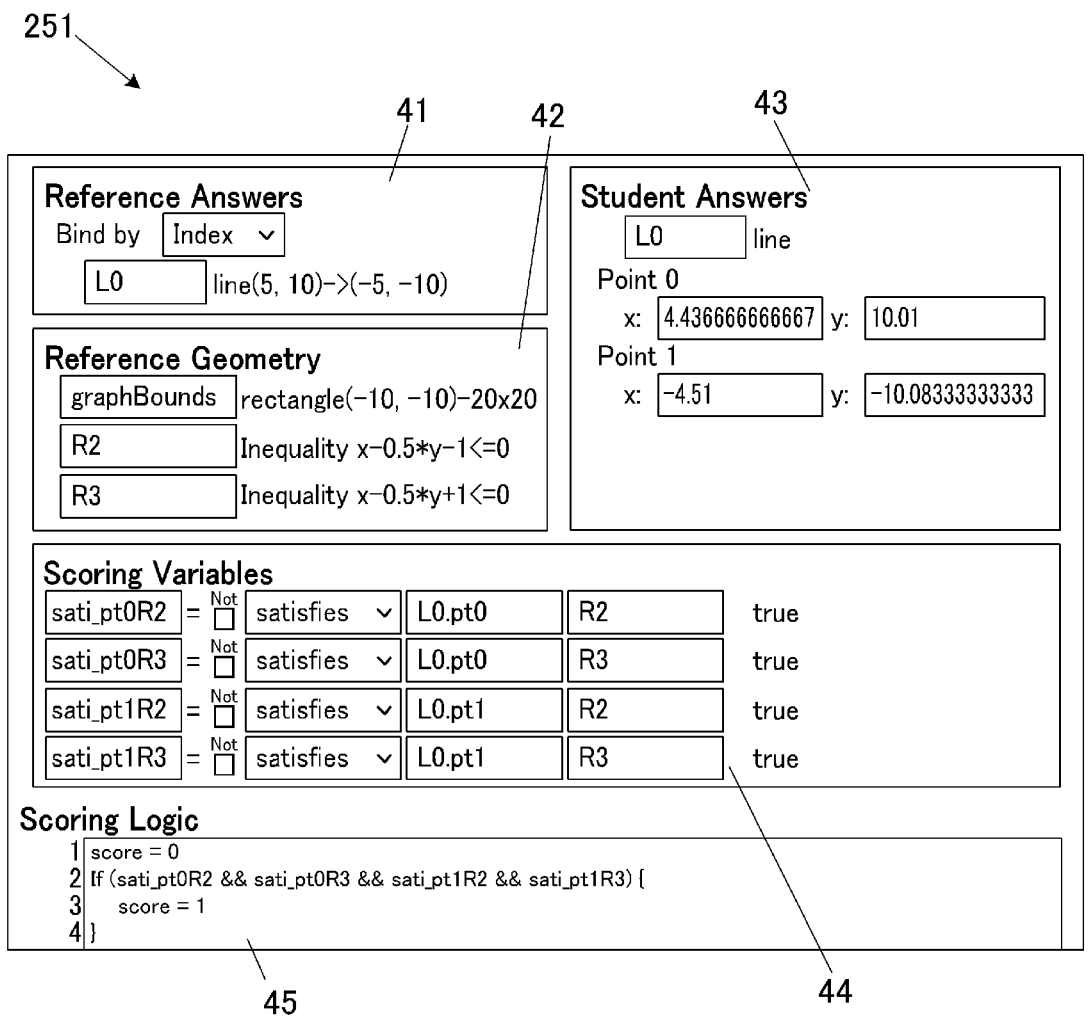
FIG. 15 shows an example of the scoring criterion setting screen reflecting the contents of the reference figure setting screen shown in FIG. 14.

FIG. 15 shows an example of the scoring criterion setting screen 251 reflecting the contents of the reference figure setting screen 252 shown in FIG. 14.

In the reference geometry information 42 on the scoring criterion setting screen 251 shown in FIG. 15, as reference geometries, the "graphBounds" representing a coordinate region for answering and the determination regions "R2", "R3" shown in FIG. 12 to FIG. 14 are defined and displayed. The inequalities representing the determination regions "R2", "R3" in the reference geometry information 42 are respectively calculated by the CPU 11 from the contents of the reference lines 63, 64 and the determination regions R2, R3 on the reference figure setting screen 252 and displayed. This eliminates the need for the user to input data for the CPU 11 to identify the determination regions R2, R3 as reference geometries and accordingly saves user time and effort.

In the scoring variable information 44, the scoring variables "sati_pt0R2", "sati_pt0R3", "sati_pt1R2" and "sati_pt1R3" are defined and displayed. To the scoring variable "sati_pt0R2", a value of the automatic scoring function "satisfies" with "L0.pt0" representing one endpoint P0 of the straight line L0 in the answer figure information 43 and the determination region "R2" as arguments is assigned. To the scoring variable "sati_pt0R3", a value of the automatic scoring function "satisfies" with "L0.pt0" representing one endpoint P0 of the straight line L0 in the answer figure information 43 and the determination region "R3" as arguments is assigned. To the scoring variable "sati_pt1R2", a value of the automatic scoring function "satisfies" with "L0.pt1" representing the other endpoint P1 of the straight line L0 in the answer figure information 43 and the determination region "R2" as arguments is assigned. To the scoring variable "sati_pt1R3", a value of the automatic scoring function "satisfies" with "L0.pt1" representing the other endpoint P1 of the straight line L0 in the answer figure information 43 and the determination region "R3" as arguments is assigned. The automatic scoring function "satisfies" is a function to return "true" if a point as an argument is located in a determination region as an argument.

In the scoring logic information 45, the scoring logic is defined to make the "score" "1" if the scoring variables "sati_pt0R2", "sati_pt0R3", "sati_pt1R2" and "sati_pt1R3" are all "true". The scoring variables "sati_pt0R2" and "sati_pt1R2" are both "true" if the straight line L0 (answer FIG. 71) in the answer figure information 43 is (fully) located in the determination region R2, and the scoring variables "sati_pt0R3" and "sati_pt1R3" are both "true" if the straight line L0 (answer FIG. 71) in the answer figure information 43 is (fully) located in the determination region R3. That is, the scoring logic shown in FIG. 15 makes the "score" "1" if the straight line L0 in the answer figure information 43 is (fully) located in the determination region R4, which is the overlap area of the determination regions R2, R3. Thus, the scoring criterion data 332 generated with the scoring criterion setting screen 251 shown in FIG. 15 is used in the scoring process to determine whether the two endpoints P0, P1 of the answer FIG. 71 are located in the determination region R4, the boundary of which is defined by the two reference lines 63, 64.

Third Example

Next, as a third example, a case will be described where a scoring criterion about an analogy in shape between a reference figure and an answer figure is set.

Figure 16:
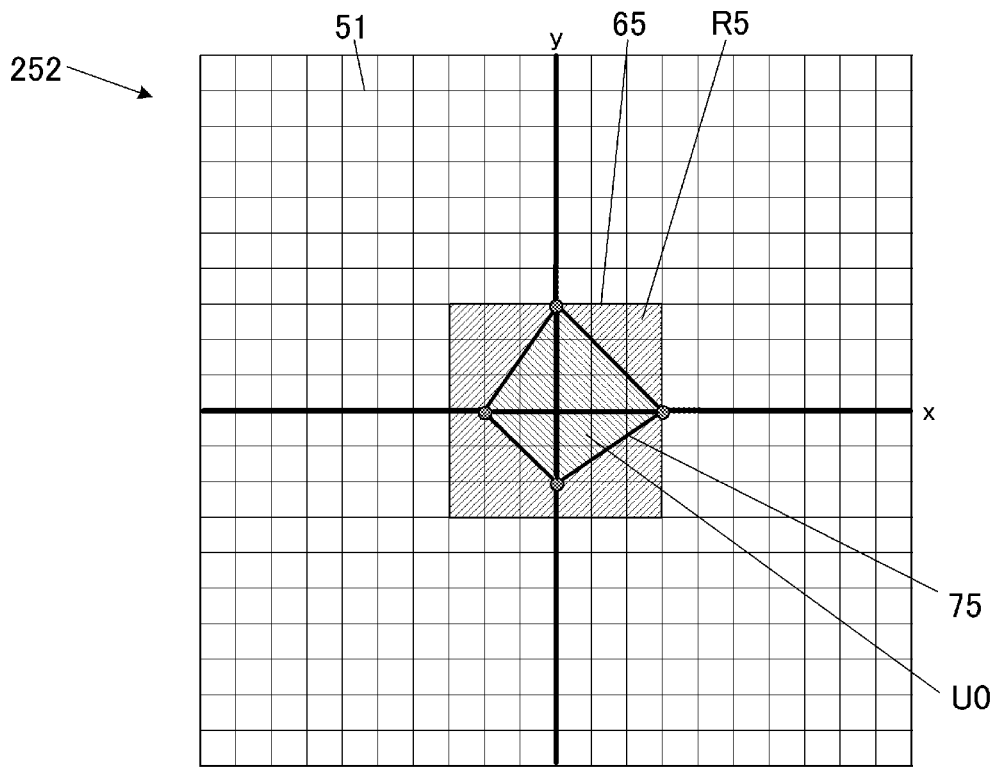
FIG. 16 shows the reference figure setting screen according to a third example.

FIG. 16 shows the reference figure setting screen 252 according to the third example. In FIG. 16, elements other than the coordinate plane 51 are not shown. The same applies to FIG. 18, FIG. 20, FIG. 21 and FIG. 22.

In FIG. 16, as a reference figure, a reference rectangle 65 having a length of each side of 6 with the origin as its center is drawn. The reference rectangle 65 represents a boundary defining a determination region R5. Also, a rectangular answer FIG. 75 with four points on the coordinate plane 51 connected is drawn. The answer FIG. 75 represents a boundary defining an answer region U0.

Figure 17:
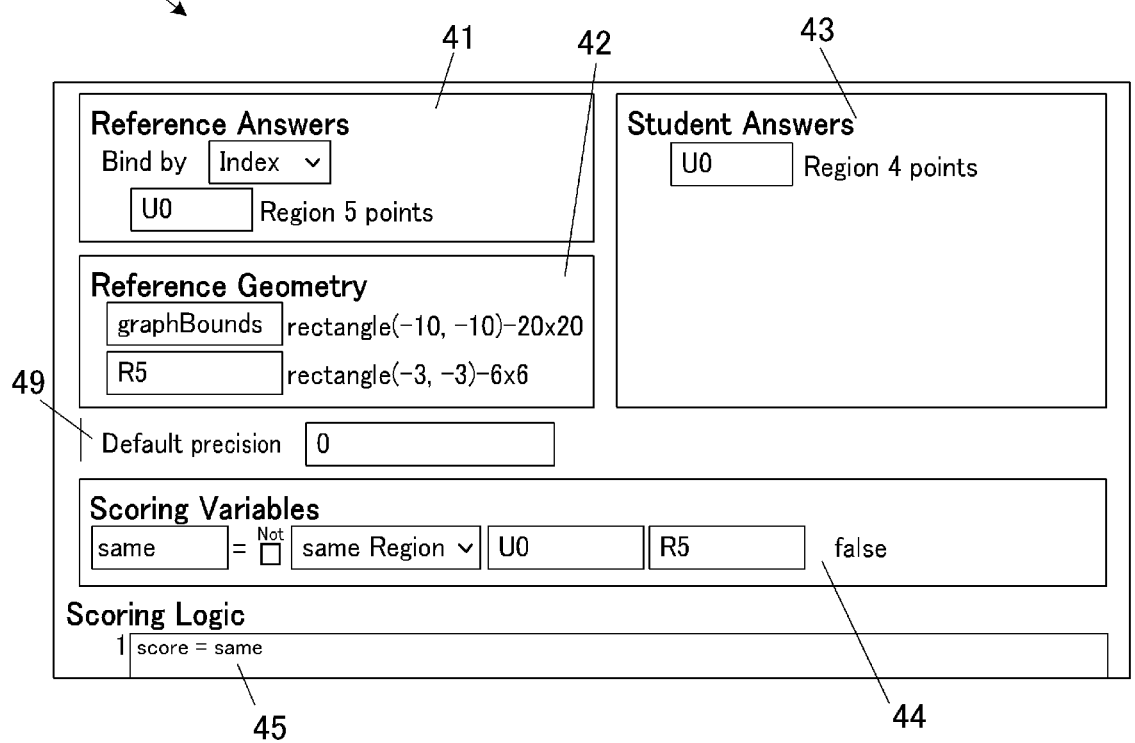
FIG. 17 shows an example of the scoring criterion setting screen reflecting the contents of the reference figure setting screen shown in FIG. 16.

FIG. 17 shows an example of the scoring criterion setting screen 251 reflecting the contents of the reference figure setting screen 252 shown in FIG. 16.

In the reference geometry information 42 on the scoring criterion setting screen 251 shown in FIG. 17, as reference geometries, the "graphBounds" representing a coordinate region for answering and the determination region "R5" shown in FIG. 16 are defined and displayed.

In the answer figure information 43, the answer region "U0", the boundary of which is represented by the answer FIG. 75, is defined.

In the scoring variable information 44, the scoring variable "same" is defined. To the scoring variable "same", a value of the automatic scoring function "sameRegion" with the answer region "U0" in the answer figure information 43 and the determination region "R5" as arguments is assigned. The automatic scoring function "sameRegion" is a function to return "true" if two regions as arguments exactly match.

On the scoring criterion setting screen 251 shown in FIG. 17, a default precision 49 is set. The default precision 49 defines an acceptable deviation amount from a correct answer (model answer). In FIG. 17, the default precision 49 is set to "0". Hence, the value of the automatic scoring function "sameRegion" is "true" if four points of the answer FIG. 75 shown in FIG. 17 and their corresponding vertices of the reference rectangle 65 exactly match. Meanwhile, for example, if the default precision 49 is set to "1", the value of the automatic scoring function "sameRegion" is "true" if the four points of the answer FIG. 75 deviate from their corresponding vertices of the reference rectangle 65 by 1 or less. The setting of the default precision 49 may be included in the scoring criterion setting screen 251 shown in any of FIG. 6, FIG. 10, FIG. 11 and FIG. 15 too.

In the scoring logic information 45, the logical formula "score=correct" determines a score. In the case shown in FIG. 16 and FIG. 17, the determination region R5 does not match with the answer region U0 corresponding to the answer FIG. 75, so that the scoring variable "same" is "false (0)", and the "score" is "0". Thus, the scoring criterion data 332 generated with the scoring criterion setting screen 251 shown in FIG. 17 is used in the scoring process to make a determination as to the analogy in shape between the answer FIG. 75 and the reference rectangle 65 as a reference figure.

Fourth Example

Next, as a fourth example, a case will be described where a scoring criterion about a comparison in area (square measure) between a reference figure and an answer figure is set.

FIG. 18 shows the reference figure setting screen 252 according to the fourth example.

In FIG. 18, as a reference figure, a reference rectangle 66 having a length of each side of 6 with the origin as its center is drawn. The reference rectangle 66 represents a boundary defining a determination region R6. Also, a hexagonal answer FIG. 76 with six points on the coordinate plane 51 connected is drawn. The answer FIG. 76 represents a boundary defining an answer region U1.

FIG. 19 shows an example of the scoring criterion setting screen 251 reflecting the contents of the reference figure setting screen 252 shown in FIG. 18.

In the reference geometry information 42 on the scoring criterion setting screen 251 shown in FIG. 19, as reference geometries, the "graphBounds" representing a coordinate region for answering and the determination region "R6" shown in FIG. 18 are defined and displayed.

In the answer figure information 43, the answer region "U1", the boundary of which is represented by the answer FIG. 76, is defined.

In the scoring variable information 44, the scoring variable "intersection" is defined. To the scoring variable "intersection", a value of the automatic scoring function "overlap" with the determination region "R6" and the answer region "U1" in the answer figure information 43 as arguments is assigned. The automatic scoring function "overlap" is a function to return the value of "(area of overlap of two regions as arguments)/(area of predetermined one of the two regions as arguments)".

In the scoring logic information 45, the logical formula "score=intersection>0.75" determines a score. This makes the "score" "1" if the value of the scoring variable "intersection" is larger than 0.75. Thus, the scoring criterion data 332 generated with the scoring criterion setting screen 251 shown in FIG. 19 is used in the scoring process to make a determination as to the comparison in area between the answer FIG. 76 and the reference rectangle 66 as a reference figure.

Fifth Example

Next, as a fifth example, a case will be described where scoring criteria about an analogy in shape, distance and/or the like between a reference figure(s) representing a graph(s) of a predetermined function(s) and an answer figure(s) are set.

Figure 20:
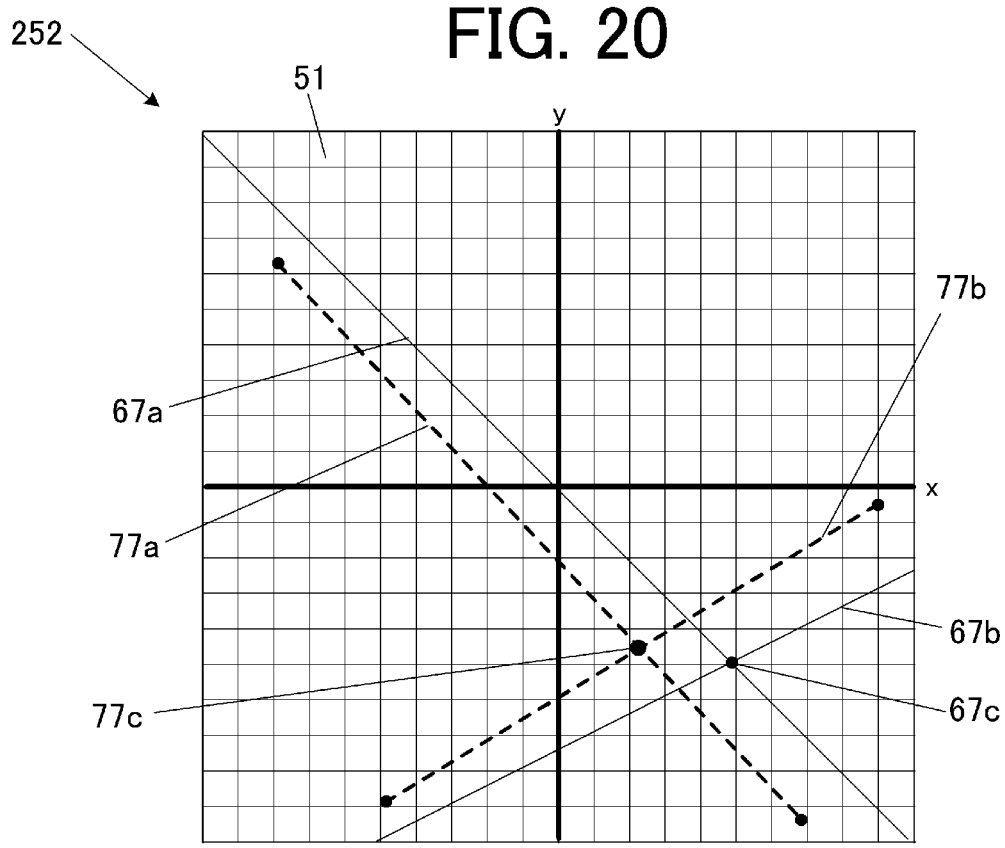
FIG. 20 shows an example of the reference figure setting screen according to a fifth example.

FIG. 20 shows an example of the reference figure setting screen 252 according to the fifth example.

On the reference figure setting screen 252 shown in FIG. 20, reference lines 67a, 67b representing graphs of two linear functions are drawn. The reference lines 67a, 67b are examples of reference figures. Also, answer FIGS. 77a, 77b of straight lines respectively for the reference lines 67a, 67b are drawn. On the basis of these reference figures, for example, the scoring variables (i) to (iii) below can be set, and a score can be calculated by the scoring logic of combination of these scoring variables.

(i) Distance (minimum distance) between each endpoint of answer FIG. 77a and reference line 67a
(ii) Distance (minimum distance) between each endpoint of answer FIG. 77b and reference line 67b
(iii) Difference or distance between intersection 77c of answer FIGS. 77a, 77b and intersection 67c of reference lines 67a, 67b For example, the scoring logic can be set to add a score of "1" if the distance in (i) is 1 or less, add a score of "1" if the distance in (ii) is 1 or less, and add a score of "1" if the intersections 77c, 67c in (iii) match.

Figure 21:
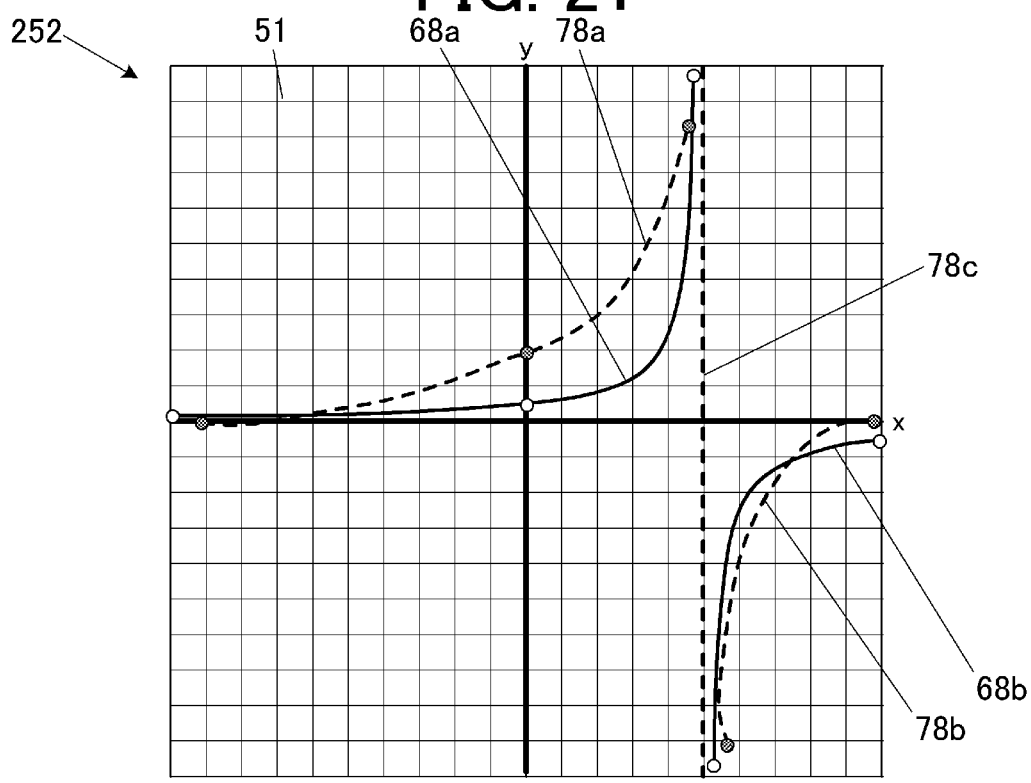
FIG. 21 shows another example of the reference figure setting screen according to the fifth example.

FIG. 21 shows another example of the reference figure setting screen 252 according to the fifth example.

On the reference figure setting screen 252 shown in FIG. 21, two reference lines 68a, 68b representing a graph of a hyperbolic function are drawn. The reference lines 68a, 68b are examples of reference figures. Also, answer FIGS. 78a, 78b of hyperbolae respectively for the reference lines 68a, 68b are drawn. On the basis of these reference figures, for example, the scoring variables (i) to (iv) below can be set, and a score can be calculated by the scoring logic of combination of these scoring variables.

(i) Value of "(area of overlap of smallest rectangles respectively enclosing answer FIG. 78a and reference line 68a)/(area of predetermined one of the two rectangles)"
(ii) Value of "(area of overlap of smallest rectangles respectively enclosing answer FIG. 78b and reference line 68b)/(area of predetermined one of the two rectangles)"
(iii) Analogy in shape between answer FIGS. 78a, 78b and reference lines 68a, 68b
(iv) x-coordinate of asymptote 78c of answer FIGS. 78a, 78b For example, the scoring logic can be set to add a score of "1" if the value in (i) is 0.75 or larger, add a score of "1" if the value in (ii) is 0.75 or larger, add a score of "1" if (iii) satisfies a predetermined analogy condition, and add a score of "1" if the x-coordinate of the asymptote 78c matches with a predetermined value (or is within a predetermined range).

Figure 22:
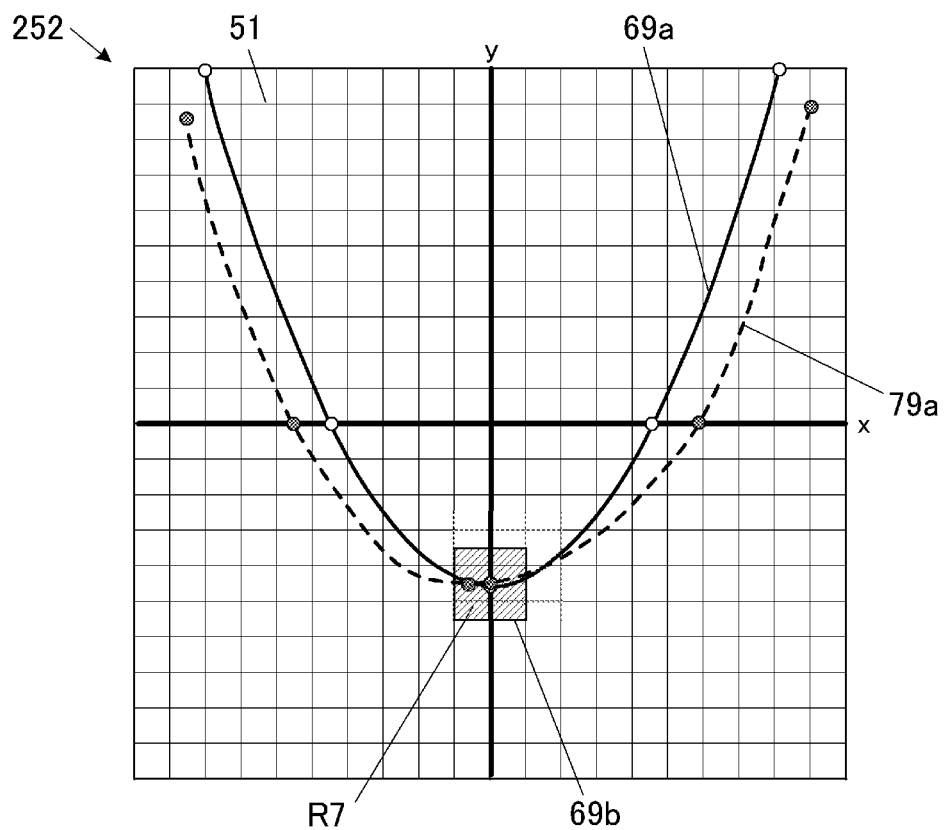
FIG. 22 shows another example of the reference figure setting screen according to the fifth example.

FIG. 22 shows another example of the reference figure setting screen 252 according to the fifth example.

On the reference figure setting screen 252 shown in FIG. 22, a reference line 69a representing a graph of a quadratic function and a reference rectangle 69b with the minimum point of the reference line 69a as its center are drawn. The reference rectangle 69b represents a boundary defining a determination region R7. The reference line 69a and the reference rectangle 69b are examples of reference figures. Also, an answer FIG. 79a of a curve for the reference line 69a is drawn. On the basis of these reference figures, for example, the scoring variables (i) to (iii) below can be set, and a score can be calculated by the scoring logic of combination of these scoring variables.

(i) Value of "(area of overlap of smallest rectangles respectively enclosing answer FIG. 79a and reference line 69a)/(area of predetermined one of the two rectangles)"
(ii) Analogy in shape between answer FIG. 79a and reference line 69a
(iii) Whether minimum point as feature point of answer FIG. 79a is located in determination region R7

For example, the scoring logic can be set to add a score of "1" if the value in (i) is 0.75 or larger, add a score of "1" if (ii) satisfies a predetermined analogy condition, and add a score of "1" if the minimum point satisfies the positional relationship in (iii).

If the reference line 69a represents a graph of a quadratic function being convex upward, the maximum point can be used as a feature point. If the reference line 69a represents a graph of a cubic function, the maximum point, the minimum point or the inflection point may be used as a feature point.

Advantageous Effects

As described above, the scoring server 10 as the information processing apparatus according to the embodiment includes the CPU (processor) that executes the scoring criterion generation program 131 (program) stored in the storage 13. The CPU 11 generates the scoring criterion data 332 (scoring criterion information) that is referenced in the scoring process of an answer figure to a problem that requires drawing of a figure in a Cartesian coordinate system that is the coordinate plane 51, wherein in response to a reference figure(s) (reference line 61, reference rectangles 62, etc.) being drawn on the coordinate plane 51 based on a user operation(s), the coordinate plane 51 being displayed on the display 25 of the client terminal 20, the scoring criterion data 332 including information on a scoring criterion(s) determined based on the reference figure is generated. This makes the following possible: to easily set scoring criteria in a visual and intuitive manner; to easily adjust scoring criteria by simple operations to adjust the shapes of reference figures displayed; as compared with the conventional method of setting the correct answer range by inputting numerical values only, to easily identify errors in setting scoring criteria if there are any; and to minutely and flexibly set scoring criteria by combining two or more reference figures.

Further, in the first example, the reference rectangles 62 as reference figures represent boundaries respectively defining the determination regions R0, R1, and the scoring criterion data 332 is used in the scoring process to determine whether the answer FIG. 71 is partly in each of the determination regions R0, R1. Further, in the second example, the reference lines 63, 64 as reference figures represent boundaries respectively defining the determination regions R2, R3, and the scoring criterion data 332 is used in the scoring process to determine whether the answer FIG. 71 is fully in each of the determination regions R2, R3. Each of these makes it possible to easily set the correct answer range, which is used as a scoring criterion(s), in a visual and intuitive manner.

Further, in the first example, the reference rectangles 62 as reference figures represent boundaries respectively defining the determination regions R0, R1, and the scoring criterion data 332 is used in the scoring process to determine whether the endpoints P0, P1 as feature points of the answer FIG. 71 are respectively located in the determination regions R0, R1. This makes it possible to easily set the correct answer range, which is used as a scoring criterion(s), in a visual and intuitive manner.

Further, in the fifth example, the answer FIGS. 77a, 77b, 78a, 78b, 79a are each a straight line or a curve of a graph, and a feature point(s) of each answer figure is/are the endpoint(s) of the straight line or the endpoint(s), maximum point, minimum point or inflection point of the curve. This makes it possible to easily and properly set scoring criteria for a problem that requires drawing of a straight line(s) or a curve(s).

Further, in the first, third and fourth examples, the reference rectangles 62, 65, 66 as reference figures are each a rectangle having sides parallel to the coordinate axes of the coordinate plane 51. This makes it possible for the CPU 11 to identify the positional relationship between a reference figure(s) and an answer figure by a simple process.

Further, in the first, third and fourth examples, the CPU 11 identifies a position(s) of the reference rectangle(s) 62, 65, 66 on the coordinate plane 51 based on the user operation to specify positions of opposite vertices of the reference rectangle(s) 62, 65, 66 on the coordinate plane 51. This makes it possible to display reference figures by simple operations.

Further, in the second example, two reference lines 63, 64 as reference figures represent a boundary defining the determination region R4, and the scoring criterion information 332 is used in the scoring process to determine whether the answer FIG. 71 is fully in the determination region R4. This makes it possible to easily and flexibly set a determination region by adjusting the slope or intercept of each reference line.

Further, in the second example, the CPU 11 sets the determination regions R2, R3 based on the user operation to specify one side or the other side of the respective reference lines 63, 64 on the coordinate plane 51, and the user operation to specify the one side or the other side of the respective reference lines 63, 64 is an operation to put a predetermined cursor, 55, on the one side or the other side of the respective reference lines 63, 64 on, of the display 25, the display screen where the reference lines 63, 64 are displayed. This makes it possible to specify determination regions by simple operations.

Further, in the third and fifth examples, the scoring criterion data 332 is used in the scoring process to make a determination as to an analogy in shape between the answer figure(s) and it/their reference figure(s). This makes it possible to easily set scoring criteria about the analogy in shape in a visual and intuitive manner.

Further, in the fourth example, the reference rectangle 66 as a reference figure is a figure that encloses a predetermined region on the coordinate plane 51, and the scoring criterion data 332 is used in the scoring process to make a determination as to a comparison in area between the answer FIG. 76 and the reference rectangle 66. This makes it possible to easily set scoring criteria about the comparison in area in a visual and intuitive manner.

Further, in the fifth example, the scoring criterion data 332 is used in the scoring process to make a determination, for example, as to distance(s) between each endpoint of the respective answer FIGS. 77a, 77b as a feature point and their reference lines 67a, 67b as reference figures shown in FIG. 20. This makes it possible to easily set scoring criteria about the distance from a reference figure (i.e., position of an answer figure) in a visual and intuitive manner.

Further, the CPU 11 performs the scoring process based on the individual data for scoring 334 that includes the scoring criterion data 332 and the answer data 333 on the answer figure. This makes it possible to perform automatic scoring based on set scoring criteria.

The storage 13 (non-transitory computer-readable storage medium) according to the embodiment stores the scoring criterion generation program 131 that causes the CPU 11 of the scoring server 10 to generate the scoring criterion data 332 that is referenced in the scoring process of an answer figure to a problem that requires drawing of a figure in a Cartesian coordinate system that is the coordinate plane 51, wherein in response to a reference figure(s) (reference line 61, reference rectangles 62, etc.) being drawn on the coordinate plane 51 based on a user operation(s), the coordinate plane 51 being displayed on the display 25 of the client terminal 20, the scoring criterion data 332 including information on a scoring criterion(s) determined based on the reference figure is generated. This makes it possible to easily set scoring criteria in a visual and intuitive manner.

The information processing method according to the embodiment is performed by, as a computer, the CPU 11 of the scoring server 10, and includes generating the scoring criterion data 332 that is referenced in the scoring process of an answer figure to a problem that requires drawing of a figure in a Cartesian coordinate system that is the coordinate plane 51, wherein in response to a reference figure(s) (reference line 61, reference rectangles 62, etc.) being drawn on the coordinate plane 51 based on a user operation(s), the coordinate plane 51 being displayed on the display 25 of the client terminal 20, the scoring criterion data 332 including information on a scoring criterion(s) determined based on the reference figure is generated. This makes it possible to easily set scoring criteria in a visual and intuitive manner.

<Others>

Those described in the above embodiment or the like are not limitations but mere examples of the information processing apparatus, the storage medium and the information processing method of the present disclosure.

For example, in the above embodiment, the scoring system 1 includes the scoring server 10, the client terminal 20 and the client server 30, but is not limited thereto. For example, the scoring system 1 may have an information processing apparatus provided with the functions of the scoring server 10, the client terminal 20 and the client server 30. Alternatively, the functions of the scoring server 10, the client terminal 20 and the client server 30 may be shared by two or more information processing apparatuses. Still alternatively, part of the functions may be performed by cloud computing. For example, a CPU (first processor) that provides a UI for generating scoring criteria and generates the scoring criterion data 332 and a CPU (second processor) that generates the scoring result data 335 may be provided in separate servers.

Further, the programs and data used in the scoring criterion generation process and the scoring process (e.g., scoring criterion generation program 131, scoring program 132, automatic scoring script 331, scoring criterion data 332, answer data 333, individual data for scoring 334 and scoring result data 335) are not necessarily stored in the storages described in the above embodiment, but may be stored in any external file server or the like.

Further, the scoring logic relevant to scoring criteria is not limited to those exemplified above as far as it somehow references the positions and/or shapes of reference figures.

Further, in the above, the scoring process is performed with the individual data for scoring 334 obtained by inserting the answer data 333 into the scoring criterion data 332, but not limited thereto. The scoring process can be performed in any manner as far as the scoring criterion information on a scoring criterion(s) and the answer information on an answer are referenced therein.

Further, in the above embodiment, figures are drawn in an xy Cartesian coordinate system that is a coordinate plane, but not limited thereto. The present disclosure is also applicable to a case where figures are drawn in an xyz Cartesian coordinate system that is a coordinate space. In this case, reference figures, answer figures and correct figures may be solids in the coordinate space.

Further, although in the above, the HDD or SDD of the storage 13 is used as the non-transitory computer-readable storage medium of the present disclosure, it is not limited thereto. The non-transitory computer-readable storage medium may be an information storage medium, such as a flash memory or a CD-ROM. Further, as a medium to provide data of the programs of the present disclosure via a communication line, a carrier wave can be used.

It goes without saying that the specific configurations and operations of the components of the scoring system 1, the scoring server 10, the client terminal 20 and the client server 30 in the above embodiment or the like can be appropriately modified within a range not departing from the scope of the present disclosure.

Although one or more embodiments or the like of the present disclosure have been described above, the scope of the present invention is not limited to the embodiments or the like described above but includes the scope of the present invention described in claims below and the scope of their equivalents.

What is claimed is:

1. An information processing apparatus comprising:
a processor configured to:
receive a first user operation to input information on a model answer to a problem;
control a display to display a correct figure in a Cartesian coordinate system, based on the input information on the model answer received through the first user operation;
receive a cursor operation on the Cartesian coordinate system displayed on the display including a second user operation to draw one or more reference lines;
determine a reference region in the Cartesian coordinate system based on the one or more reference lines drawn via the cursor operation;
control the display to display the correct figure, the one or more reference lines and the reference region determined based on the one or more reference lines in the Cartesian coordinate system;
determine coordinates of the reference region displayed on the display; and
generate a scoring logic to output one of at least two outcomes in response to input of an answer figure, as an answer to the problem, received through a communication network,
wherein the one of the at least two outcomes is output according to the scoring logic based on whether coordinates of at least a portion of the answer figure matches the coordinates of the reference region displayed on the display, and
wherein the one of the at least two outcomes is output based on whether a minimum distance between a predetermined feature point of the answer figure and the reference region is less than or equal to a predetermined distance.

2. The information processing apparatus according to claim 1,
wherein the reference lines represent a boundary defining the reference region.

3. The information processing apparatus according to claim 1,
wherein the answer figure is a straight line or a curve of a graph, and
wherein the at least a portion of the answer figure is:
an endpoint of the straight line; or
an endpoint, a maximum point, a minimum point or an inflection point of the curve.

4. The information processing apparatus according to claim 1,
wherein the reference region is a rectangle having sides parallel to coordinate axes of the Cartesian coordinate system.

5. The information processing apparatus according to claim 4,
wherein the processor is configured to identify a position of the reference region in the Cartesian coordinate system based on the second user operation to specify positions of opposite vertices of the reference region in the Cartesian coordinate system.

6. The information processing apparatus according to claim 1, wherein the one of the at least two outcomes is output according to the scoring logic based on whether the answer figure is fully in the reference region.

7. The information processing apparatus according to claim 6,
wherein the processor is configured to:
receive another cursor operation on the Cartesian coordinate system displayed on the display including a third user operation to specify a side of a first reference line of the one or more reference lines and to specify a side of the second refence line of the one or more reference lines; and
determine the reference region in the Cartesian coordinate system based on the side of the first reference line and the side of the second reference line specified.

8. The information processing apparatus according to claim 1,
wherein the processor is configured to make a determination as to an analogy in shape between the answer figure and the correct figure based on the one of at least two outcomes.

9. The information processing apparatus according to claim 1,
wherein the scoring logic compares an area between the answer figure and an area of the reference region.

10. The information processing apparatus according to claim 1,
wherein the processor is configured to perform scoring based on the scoring logic and the answer figure.

11. A non-transitory computer-readable storage medium storing a program that causes a processor of an information processing apparatus to at least perform:
receive a first user operation to input information on a model answer to a problem;
control a display to display a correct figure in a Cartesian coordinate system, wherein the correct figure displayed on the display based on the input information on the model answer received through the first user operation;
receive a cursor operation on the Cartesian coordinate system displayed on the display including a second user operation to draw one or more reference lines;
determine a reference region in the Cartesian coordinate system based on the one or more reference lines drawn via the cursor operation;
control the display to display the correct figure, the one or more reference lines and the reference region determined based on the one or more reference lines in the Cartesian coordinate system;
determine coordinates of the reference region displayed on the display; and
generate a scoring logic to output one of at least two outcomes in response to input of an answer figure, as an answer to the problem, received through a communication network,
wherein the one of the at least two outcomes is output according to the scoring logic based on whether coordinates of at least a portion of the answer figure matches the coordinates of the reference region displayed on the display, and
wherein the one of the at least two outcomes is output based on whether a minimum distance between a predetermined feature point of the answer figure and the reference region is less than or equal to a predetermined distance.

12. The non-transitory computer-readable storage medium according to claim 11,
wherein the reference lines represent a boundary defining the reference region.

13. The non-transitory computer-readable storage medium according to claim 11,
wherein the answer figure is a straight line or a curve of a graph, and
wherein the at least a portion of the answer figure is:
an endpoint of the straight line; or
an endpoint, a maximum point, a minimum point or an inflection point of the curve.

14. An information processing method that is performed by a computer, comprising:
receiving a first user operation to input information on a model answer to a problem;
controlling a display to display a correct figure in a Cartesian coordinate system, wherein the correct figure displayed on the display based on the input information on the model answer received through the first user operation;
receiving a cursor operation on the Cartesian coordinate system displayed on the display including a second user operation to draw one or more reference lines;
determining a reference region in the Cartesian coordinate system based on the one or more reference lines drawn via the cursor operation;
controlling the display to display the correct figure, the one or more reference lines and the reference region determined based on the one or more reference lines in the Cartesian coordinate system;
determining coordinates of the reference region displayed on the display; and
generating a scoring logic to output one of at least two outcomes in response to input of an answer figure, as an answer to the problem, received through a communication network,
wherein the one of the at least two outcomes is output according to the scoring logic based on whether coordinates of at least a portion of the answer figure matches the coordinates of the reference region displayed on the display, and
wherein the one of the at least two outcomes is output based on whether a minimum distance between a predetermined feature point of the answer figure and the reference region is less than or equal to a predetermined distance.

15. The information processing method according to claim 14,
wherein the reference lines represent a boundary defining the reference region.

16. The information processing method according to claim 14,
wherein the answer figure is a straight line or a curve of a graph, and
wherein the at least a portion of the answer figure is:
an endpoint of the straight line; or an endpoint, a maximum point, a minimum point or an inflection point of the curve.

* * * * *